United States Patent
Okinaka et al.

(10) Patent No.: US 6,627,313 B2
(45) Date of Patent: Sep. 30, 2003

(54) SPINDLE-SHAPED MAGNETIC METAL PARTICLES CONTAINING IRON AS MAIN COMPONENT AND PROCESSES FOR PRODUCING THE SAME

(75) Inventors: Kenji Okinaka, Ube (JP); Masayuki Uegami, Onoda (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/970,034

(22) Filed: Oct. 4, 2001

(65) Prior Publication Data

US 2003/0118868 A1 Jun. 26, 2003

(30) Foreign Application Priority Data

Oct. 6, 2000 (JP) .......................................... 2000-308383

(51) Int. Cl.⁷ .................................................. G11B 5/66
(52) U.S. Cl. ................ 428/402; 428/403; 428/694 BA; 428/900; 427/128; 427/129; 427/130; 423/138; 423/140; 423/148; 423/151; 420/80; 420/83; 420/103; 148/101; 148/301; 148/311; 148/331
(58) Field of Search .......................... 428/694 BA, 403, 428/402, 900; 427/128–130; 423/138, 140, 148, 151; 148/101, 301, 311, 331; 420/80, 83, 103

(56) References Cited

U.S. PATENT DOCUMENTS 6,309,479 B1 * 10/2001 Okinaka ..................... 148/301
6,391,450 B1 * 5/2002 Okinaka ..................... 428/402
6,398,863 B1 * 6/2002 Okinaka . .................... 106/453
6,544,673 B1 * 4/2003 Okinaka ............... 428/654 BA

FOREIGN PATENT DOCUMENTS

| DE | 197 17 560 A1 | 10/1997 |
| EP | 0 125 150 | 11/1984 |
| EP | 0 827 137 A1 | 3/1998 |
| EP | 0940369 A2 * | 9/1999 |
| EP | 0 999 185 A1 | 5/2000 |

* cited by examiner

Primary Examiner—Leszek Kiliman
(74) Attorney, Agent, or Firm—Nixon & Vanderhye P.C.

(57) ABSTRACT

Spindle-shaped magnetic metal particles containing iron as a main component of the present invention, have an average major axis diameter (L) of 0.05 to 0.15 $\mu$m; a coercive force of 111.4 to 143.2 kA/m; a Co content of from 0.5 to less than 5 atm % based on whole Fe; a crystallite size of from 150 to less than 170 Å; a ratio of Al to Co from 1.0:1 to less than 2.0:1; a specific surface area (S) represented by the formula:

$$S \leq -160 \times L + 65;$$

an oxidation stability ($\Delta\sigma s$) of saturation magnetization of not more than 5.0%; and an ignition temperature of not less than 140° C. The spindle-shaped magnetic metal particles containing iron as a main component, exhibit an adequate coercive force, and are excellent in dispersibility, oxidation stability and coercive force distribution despite fine particles, especially notwithstanding the particles have an average major axis diameter as small as 0.05 to 0.15 $\mu$m.

11 Claims, No Drawings

SPINDLE-SHAPED MAGNETIC METAL PARTICLES CONTAINING IRON AS MAIN COMPONENT AND PROCESSES FOR PRODUCING THE SAME

BACKGROUND OF THE INVENTION

The present invention relates to spindle-shaped magnetic metal particles containing iron as a main component and a process for producing the spindle-shaped magnetic metal particles, and more particularly, to spindle-shaped magnetic metal particles containing iron as a main component, which exhibit an adequate coercive force, and are excellent in dispersibility, oxidation stability and coercive force distribution despite fine particles, especially notwithstanding the particles have an average major axis diameter as small as 0.05 to 0.15 $\mu$m In recent years, recording-time prolongation, miniaturization and lightening of audio, video or computer magnetic recording and reproducing apparatuses for various magnetic recording media such as digital audio tapes (DAT) for people's livelihood use, 8-mm video tapes, Hi-8 tapes, VTR tapes for business use, computer tapes or discs thereof have proceeded more rapidly. In particular, VTRs (video tape recorders) are now widespread, so that there have been intensely developed VTRs aiming at the transfer of analog recording types into digital ones in addition to the above recording-time prolongation, miniaturization and lightening thereof. On the other hand, with such recent tendencies, the magnetic recording media have been required to have high image quality and high output characteristics, especially high frequency characteristics. To meet these requirements, it is necessary to reduce noise due to the magnetic recording media themselves and enhance residual magnetic flux density, coercive force, dispersibility, filling property and tape-surface smoothness thereof. Therefore, it ha been further required to improve S/N ratio of the magnetic recording media.

These properties of the magnetic recording media have a close relation to magnetic particles used therein. In recent years, magnetic metal particles containing iron as a main component have been noticed, because such particles can show a higher coercive force and a larger saturation magnetization as compared to those of conventional magnetic iron oxide particles, and such magnetic metal particles containing iron as a main component have been already used as magnetic particles for magnetic recording media such as DAT, 8-mm video tapes, Hi-8 tapes, video tapes for business use, computer tapes or discs. The magnetic metal particles containing iron as a main component conventionally used in DAT, 8-mm video tapes, Hi-8 tapes or the like have been required to be further improved in output characteristics and weather resistance. In addition, the magnetic metal particles containing iron as a main component must fulfill applicability to existing format and good economy at the same time. Therefore, it has been strongly required to provide magnetic metal particles containing iron as a main component capable of satisfying the above requirements while minimizing amounts of various metals added thereto.

Various properties of magnetic recording media are detailed below.

In order to obtain high image quality in video magnetic recording media, it has been required to enhance S/N ratio and video frequency characteristics thereof. For this reason, it is important to improve a surface smoothness of the magnetic recording media. For improving the surface smoothness, it is also required to improve a dispersibility of magnetic particles in coating composition as well as orientation and filling properties thereof in coating film. In addition, in order to enhance the video frequency characteristics, the magnetic recording media have been required to exhibit not only a high coercive force and a large residual magnetic flux density, but also an excellent S.F.D. (Switching Field Distribution), i.e., a small coercive force distribution.

Further, it is important that the magnetic recording media can show good repeat-running property, good still property as well as high recording reliability even when used under severe environmental conditions, i.e., high durability.

As to the magnetic metal particles containing iron as a main component for magnetic recording media capable of satisfying the above various properties, those having a larger particle size are preferable from the standpoint of improvement in dispersibility and oxidation stability. On the contrary, the magnetic metal particles containing iron as a main component, having a smaller particle size are preferable from the standpoint of improvement in surface smoothness and reduction of noise. However, the smaller the particle size of the magnetic metal particles, the poorer the dispersibility and oxidation stability thereof. Also, when the particle size becomes smaller, the coercive force thereof is generally increased. Therefore, it is necessary to appropriately control the particle size for attaining aimed magnetic properties. Further, it is preferable to incorporate a large amount of cobalt into the magnetic metal particles containing iron as a main component in the consideration of chemical composition thereof since as well known in the arts, cobalt forms a solid solution with iron and contributes to improvement in oxidation stability. However, the use of a large amount of expensive cobalt is disadvantageous from economical viewpoint. Consequently, it has been demanded to provide magnetic metal particles containing iron as a main component exhibiting an adequate coercive force as well as excellent dispersibility and oxidation stability despite minimizing contents of expensive metal elements such as cobalt and reducing the particle size.

As known in the arts, the magnetic metal particles containing iron as a main component are produced by heat-treating either goethite particles, hematite particles obtained by heat-dehydrating the goethite particles, or particles obtained by incorporating different metal elements other than iron into the above goethite or hematite particles as starting material, in a non-reducing atmosphere, if required; and then heat-reducing the resultant particles in a reducing atmosphere. In this case, it is required that the obtained magnetic metal particles containing iron as a main component can analogously maintain shape and size of the goethite particles as starting material by appropriately controlling the shape and size of the goethite particles and further by preventing heat fusion between particles upon heat-treatments such as heat-dehydration and heat-reduction, or deformation and shape-breakage of each particle.

The goethite particles as starting material are classified into two kinds of goethite particles according to configurations thereof, i.e., acicular goethite particles produced by using alkali hydroxide, and spindle-shaped goethite particles produced by using alkali carbonate. The acicular goethite particles tend to generally have a large aspect ratio, but tend to be deteriorated in particle size distribution and become large in size as compared to spindle-shaped goethite particles. The particle size distribution is an index of uniformity of primary particles and, therefore, has a close relationship with coercive force distribution and oxidation stability of the magnetic metal particles containing iron as a main component. Consequently, spindle-shaped goethite particles having an excellent particle size distribution are preferably used as the starting materials of the magnetic metal particles containing iron as a main component.

On the other hand, as heat-reducing apparatuses, there are known fluidized a bed-type reducing apparatus for heat-reducing the starting material while fluidizing the material in the form of particles, a fixed-bed-type reducing apparatus for heat-reducing a fixed-bed formed of the starting material which is granulated into granular particles, a moving bed-type reducing apparatus for heat-reducing the starting material while moving the fixed-bed thereof, or the like.

With the increasing demand for developing mass-production techniques in association with the increase in amount of the used magnetic metal particles containing iron as a main component, among the above apparatuses, the fixed-bed-type reducing apparatus (including the moving bed-type reducing apparatus) are preferred from industrial and economical viewpoints, because the apparatus of this type is capable of mass-producing the magnetic metal particles containing iron as a main component without scattering thereof even when a large amount of reducing gas such as hydrogen is flowed therethrough.

However, when the fixed-bed formed from the particles is heat-reduced in a hydrogen atmosphere, a water vapor partial pressure of the reaction system is increased by abrupt reduction caused at a lower portion of the fixed-bed. As a result, the particles located at an upper portion of the fixed-bed tend to suffer from more severe shape breakage or minor axis growth as compared to those located at the lower portion of the fixed-bed, resulting in different properties of the particles obtained from the lower and upper portions of the fixed-bed. Therefore, it becomes difficult to obtain magnetic metal particles containing iron as a main component having uniform properties, as a whole.

In general, it is required that the magnetic metal particles containing iron as a main component can still maintain shape and size of goethite particles or hematite particles as starting material by preventing heat fusion between particles or deformation and shape-breakage of the respective particles. The magnetic metal particles containing iron as a main component suffering from shape-breakage cannot show a high coercive force because of poor shape anisotropy thereof, resulting in deteriorated particle size distribution. Further, upon the production of magnetic recording media, such magnetic metal particles containing iron as a main component show deteriorated dispersibility due to the increase in intermolecular force or magnetic adhesion force between particles when kneaded with a binder resin and dispersed therein. As a result, a magnetic coating film produced from such magnetic metal particles containing iron as a main component is deteriorated in squareness, thereby failing to obtain a magnetic recording medium having an excellent SFD.

Consequently, it has been strongly required to provide a heat-reducing process capable of producing magnetic metal particles containing iron as a main component which are substantially free from shape breakage and can show uniform properties notwithstanding the particles are located at either lower or upper portion of the fixed-bed upon the heat-reduction.

Under these circumstances, as magnetic metal particles containing iron as a main component used for audio or video magnetic recording media such as digital audio tapes (DAT) for general use, 8-mm video tapes and Hi-8 tapes, there have been demanded such magnetic metal particles having an adequate coercive force of 111.4 to 143.2 kA/m (1,400 to 1,800 Oe) as well as good dispersibility and oxidation stability even though the content of expensive elements such as cobalt is minimized and the particle size is reduced in order to further improve the properties of the magnetic, metal particles containing iron as a main component and achieve a better economy.

As methods for improving various properties of magnetic metal particles, there are known (1) techniques of specifying the composition of magnetic metal particles (Japanese Patent Application Laid-Open (KOKAI) Nos. 7-210856, 8-279142, 9-293233, 9-295814, 10-69629, 10-245233, 10-275326, 10-334455, 10-334457, 11-11951, 11-130439 and 11-251122); (2) techniques of controlling the BET specific surface area to a low value (Japanese Patent Publication (KOKOKU) No. 1-18961 and Japanese Patent Application Laid-Open (KOKAI) No. 8-236327); (3) techniques for obtaining magnetic metal particles containing iron as a main component which are uniform in properties and can show a high coercive force, by forming a fixed-bed of particles and heat-treating the fixed-bed (Japanese-Patent Application Laid-Open (KOKAI) Nos. 54-62915, 4-224609 and 6-93312); or the like.

At present, it has been strongly required to provide spindle-shaped magnetic metal particles containing iron as a main component which can exhibit not only an adequate coercive force of 111.4 to 143.2 kA/m (1,400 to 1,800 Oe), but also good dispersibility, good oxidation stability and excellent coercive force distribution, despite fine particles, especially notwithstanding the average major axis diameter thereof is as small as 0.05 to 0.15 μm. However, such spindle-shaped magnetic metal particles containing iron as a main component have not been obtained conventionally.

Namely, in the above techniques (1) of specifying the composition of magnetic metal particles as described in the above KOKAIs, although the contents of Co, Al and rare earth element based on whole Fe are specified, there are no descriptions concerning the relationship between major axis diameter, specific surface area and crystallite size of the particles. The magnetic metal particles fail to satisfy all of the requirements, i.e., all of adequate coercive force, and excellent dispersibility and oxidation stability at the same time in spite of fine particles.

In addition, as to the above techniques (2) of controlling the BET specific surface area to a low value, in Japanese Patent Publication (KOKOKU) No. 1-18961 (1989), there is disclosed the method of obtaining magnetic metal particles containing iron as a main component having an aimed coercive force and a low specific surface area by appropriately selecting the particle size and aspect ratio, thereby reducing a viscosity of a coating composition containing the particles. However, in this method, neither oxidation stability of the magnetic metal particles containing iron as a main component nor squareness and orientation property of coating film are taken into consideration. Further, in Japanese Patent Application Laid-Open (KOKAI) No. 8-236327 (1986), there is described the method of precipitating metal hydrate or metal oxide simultaneously with surface oxidation of magnetic metal particles containing iron as a main component. However, in this method, the crystallite size of the particles is not taken into consideration. Further, since the coercive force of magnetic coating film is considerably different from that of the magnetic metal particles containing iron as a main component, it will be difficult to produce magnetic recording medium having aimed magnetic properties.

Further, as to the techniques (3) of obtaining magnetic metal particles containing iron as a main component by forming a fixed-bed of starting particles, in Japanese Patent Application Laid-Open (KOKAI) No. 4-224609 (1992), although it is described that the atmosphere used upon heating is hydrogen, no temperature-rising rate is specified therein. Therefore, in this KOKAI, oxidation stability of the magnetic metal particles containing iron as a main component is not sufficiently considered. Also, in the method described in Japanese Patent Application Laid-Open (KOKAI) No. 54-62915 (1979), magnetic metal particles containing iron as a main component obtained therein exhibit a coercive force as low as about 95.5 kA/m (1,200 Oe) probably because of nitrogen atmosphere used upon heating and low superficial velocity of reducing gas. Further, in this method, the dispersibility in coating composition as well as squareness and orientation property of coating film are not sufficiently considered. Furthermore, in the method described in Japanese Patent Application Laid-Open (KOKAI) No. 6-93312 (1994), since no cobalt is incorporated into the particles, the oxidation stability of magnetic particles, the dispersibility in coating composition, the squareness and orientation property of coating film etc., are not sufficiently considered.

As a result of the present inventors' earnest studies for solving the above problems, it has been found that by adding a Co compound in an amount of from 0.5 to less than 5 atm % (calculated as Co) based on whole Fe, to a water suspension containing a ferrous-containing precipitate during aging but prior to the elapse of 20% of the whole aging time before initiation of oxidation reaction; conducting the oxidation reaction such that 30 to 50% of whole $Fe^{2+}$ is oxidized while passing an oxygen-containing gas through the obtained water suspension at a superficial velocity of 2.3 to 3.5 cm/s; after adding an Al compound in an amount of from 5 to 10 atm % (calculated as Al) based on whole Fe, to the resultant water suspension, successively conducting the oxidation reaction, thereby obtaining spindle-shaped goethite particles; treating the water suspension containing the obtained spindle-shaped goethite particles with an anti-sintering agent containing a rare earth compound in an amount of 1.5 to 5 atm % (calculated as rare earth element) based on whole Fe; then heat-treating the spindle-shaped goethite particles at a temperature of 650 to 800° C. in a non-reducing atmosphere, thereby obtaining spindle-shaped hematite particles; introducing the obtained spindle-shaped hematite particles into a reducing apparatus to form a fixed-bed thereof having a height of 3 to 15 cm; heating the fixed-bed to a temperature of 400 to 700° C. at a temperature-rising rate of 10 to 80° C./minute in an atmosphere of a reducing gas flowed therethrough at a superficial velocity of 40 to 150 cm/s to reduce the spindle-shaped hematite particles; and forming a surface oxide coat on the respective particles, the thus obtained spindle-shaped magnetic metal particles containing iron as a main component can exhibit not only adequate coercive force, good dispersibility and good oxidation stability, but also excellent coercive force distribution. The present invention has been attained on the basis of this finding.

SUMMARY OF THE INVENTION

An object of the present invention is to provide spindle-shaped magnetic metal particles containing iron as a main component which can exhibit not only adequate coercive force, good dispersibility and good oxidation stability, but also excellent coercive force distribution despite fine particles, especially notwithstanding the average major axis diameter thereof is as small as 0.05 to 0.15 µm.

Another object of the present invention is to provide a process for producing spindle-shaped magnetic metal particles containing iron as a main component which are fine particles having an average major axis diameter of 0.05 to 0.15 µm, and can exhibit not only adequate coercive force, good dispersibility and good oxidation stability, but also excellent coercive force distribution, using a reducing apparatus in which a fixed-bed of the particles is formed.

To the accomplish the aim, in a first aspect of the present invention, there are provided spindle-shaped magnetic metal particles containing iron as a main component, having an average major axis diameter (L) of 0.05 to 0.15 µm; a coercive force of 111.4 to 143.2 kA/m; a Co content of from 0.5 to less than 5 atm % based on whole Fe; a crystallite size of from 150 to less than 170 Å; a ratio of Al to Co from 1.0:1 to less than 2.0:1; a specific surface area (S) represented by the formula:

$$S \leq -160 \times L30\ 65;$$

an oxidation stability (Δσs) of saturation magnetization of not more than 5.0%; and an ignition temperature of not less than 140° C.

In a second aspect of the present invention, there are provided spindle-shaped magnetic metal particles containing iron as a main component, having an average major axis diameter (L) of 0.05 to 0.15 µm; a coercive force of 111.4 to 143.2 kA/m; a Co content of from 0.5 to less than 5 atm % based on whole Fe; a crystallite size of from 150 to less than 170 Å; a ratio of Al to Co from 1.0:1 to less than 2.0:1; a specific surface area (S) represented by the formula:

$$S \leq -160 \times L + 65;$$

an oxidation stability (Δσs) of saturation magnetization of not more than 5.0%; and an ignition temperature of not less than 140° C., which are produced by heat-dehydrating spindle-shaped goethite particles to obtain spindle-shaped hematite particles and then heat-reducing the spindle-shaped hematite particles, said spindle-shaped goethite particle comprising a spindle-shaped goethite seed crystal particle containing Co, a goethite layer formed on the surface of the spindle-shaped goethite seed crystal particle, containing Co and Al, and a surface layer form on the goethite layer, comprising rare earth compounds, a cobalt content in the spindle-shaped goethite seed crystal particle being from 0.5 to less than 5 atm % based on whole Fe contained in the spindle-shaped goethite particle, an Al content in the goethite layer being from 5 to 10 atm % based on whole Fe contained in the spindle-shaped goethite particle, and the rare earth content in the surface layer being 1.5 to 5 atm % based on whole Fe contained in the spindle-shaped goethite particle.

In a third aspect of the present invention, there are provided spindle-shaped magnetic metal particles containing iron as a main component, having an average major axis diameter (L) of 0.05 to 0.15 µm; a coercive force of 111.4 to 143.2 kA/m; a Co content of from 0.5 to less than 5 atm % based on whole Fe; a crystallite size of from 150 to less than 170 Å; a ratio of Al to Co from 1.0:1 to less than 2.0:1; a specific surface area (S) represented by the formula:

$$S \leq -160 \times L + 65;$$

an oxidation stability (Δσs) of saturation magnetization of not more than 5.0%; and an ignition temperature of not less than 140° C., which are produced by heat-reducing spindle-shaped hematite particles, said spindle-shaped hematite particle comprising a spindle-shaped hematite particle containing Co, a hematite layer formed on the surface of the spindle-shaped hematite particle, containing Co and Al, and a surface layer form on the hematite layer, comprising rare earth compounds, a cobalt content in the spindle-shaped hematite particle being from 0.5 to less-than 5 atm % based on whole Fe contained in the spindle-shaped hematite particle, an Al content in the hematite layer being from 5 to 10 atm % based on whole Fe contained in the spindle-shaped hematite particle, and the rare earth content in the surface layer being 1.5 to 5 atm % based on whole Fe contained in the spindle-shaped hematite particle.

In a fourth aspect of the present invention, there is provided a process for producing spindle-shaped magnetic metal particles containing iron as a main component, comprising:

a first step comprising: aging a water suspension containing a ferrous-containing precipitate produced by reacting a mixed aqueous alkali solution comprising an aqueous alkali carbonate solution and an aqueous alkali hydroxide solution with an aqueous ferrous salt solution, in a non-oxidative atmosphere; conducting an oxidation reaction of the water suspension by passing an oxygen-containing gas therethrough, thereby producing spindle-shaped goethite seed crystal particles; and passing again an oxygen-containing gas through the water suspension containing both the ferrous-containing precipitate and the spindle-shaped goethite seed crystal particles so as to conduct an oxidation reaction thereof, thereby forming a goethite layer on the surface of the seed crystal particles to obtain spindle-shaped goethite particles, upon the production of said seed crystal particles, a Co compound being added in an amount of from 0.5 to less than 5 atm %, calculated as Co, based on whole Fe, to the water suspension containing the ferrous-containing precipitate during the aging thereof but prior to the elapse of 20% of the whole aging time before initiation of the oxidation reaction; the oxidation reaction being conducted while passing the oxygen-containing gas through the water suspension at a superficial velocity of 2.3 to 3.5 cm/s such that 30 to 50% of whole $Fe^{2+}$ is oxidized; an Al compound being added in an amount of 5 to 10 atm %, calculated as Al, based on whole Fe; and the oxidation reaction being successively conducted to obtain spindle-shaped goethite particles;

a second step comprising treating the spindle-shaped goethite particles obtained in the above first step, with an anti-sintering agent containing a rare earth compound in an amount of 1.5 to 5 atm %, calculated as a rare earth element, based on whole Fe; and then heat-treating the thus treated spindle-shaped goethite particles at a temperature of 650 to 800° C. in a non-reducing atmosphere, thereby obtaining spindle-shaped hematite particles; and a third step comprising charging the spindle-shaped hematite particles obtained in the above second step into a reducing apparatus to form a fixed-bed-having a height of 3 to 15 cm; heating the fixed-bed of the spindle-shaped hematite particles to a temperature of 400 to 700° C. at a temperature-rising rate of 10 to 80° C./minute in an atmosphere of a reducing gas passed though the reducing apparatus at a superficial velocity of 40 to 150 cm/s, thereby reducing the spindle-shaped hematite particles; and then forming an oxide coating film on the surface of the thus reduced particles, thereby obtaining the magnetic metal particles containing iron as a main component.

In a fifth aspect of the present invention, there is provided a magnetic recording medium comprising a non-magnetic substrate and a magnetic recording layer formed on the non-magnetic substrate comprising a binder resin and spindle-shaped magnetic metal particles containing iron as a main component, which have an average major axis diameter (L) of 0.05 to 0.15 μm; a coercive force of 111.4 to 143.2 ka/m; a Co content of from 0.5 to less than 5 atm % based on whole Fe; a crystallite size of 150 to 170 Å; a ratio of Al to Co from 1.0:1 to less than 2.0:1; a specific surface area (S) represented by the formula:

$$S \leq -160 \times L + 65;$$

an oxidation stability (Δσs) of saturation magnetization of not more than 5.0%; and an ignition temperature of not less than 140° C.

In a sixth aspect of the present invention, there is provided a magnetic recording medium comprising a non-magnetic base film; a non-magnetic undercoat layer formed on said non-magnetic base film; and a magnetic recording layer formed on the non-magnetic substrate comprising a binder resin and spindle-shaped magnetic metal particles containing iron as a main component, which have an average major axis diameter (L) of 0.05 to 0.15 μm; a coercive force of 111.4 to 143.2 kA/m; a Co content of from 0.5 to less than 5 atm % based on whole Fe; a crystallite size of 150 to 170 Å; a ratio of Al to Co from 1.0:1 to less than 2.0:1; a specific surface area (S) represented by the formula:

$$S \leq -160 \times L30\ 65;$$

an oxidation stability (Δσs) of saturation magnetization of not more than 5.0%; and an ignition temperature of not less than 140° C.

In a seventh aspect of the present invention, there are provided spindle-shaped magnetic metal particles containing iron as a main component, having an average major axis diameter (L) of 0.05 to 0.15 μm; a size distribution (standard deviation/average major axis diameter) of not more than 0.30; an aspect ratio of 4:1 to 8:1; a coercive force of 111.4 to 143.2 kA/m; a Co content of from 0.5 to less than 5 atm % based on whole Fe; an Al content of from 5 to 10 atm % based on whole Fe; a rare earth element content of from 1.5 to 5 atm % based on whole Fe; a crystallite size of from 150 to less than 170 Å; a ratio of Al to Co from 1.0:1 to less than 2.0:1; a specific surface area (S) represented by the formula:

$$S \leq -160 \times L + 65;$$

an oxidation stability (Δσs) of saturation magnetization of not more than 5.0%; and an ignition temperature of not less than 140° C.

DETAILED DESCRIPTION OF THE INVENTION

First, the spindle-shaped magnetic metal particles containing iron as a main component according to the present invention are described below.

The spindle-shaped magnetic metal particles containing iron as a main component according to the present invention contain Co in an amount of usually from 0.5 to less than 5 atm %, preferably from 1.0 to 4.8 based on whole Fe. When the Co content is less than 0.5 atm %, the effect of improving magnetic properties cannot be exhibited. When the Co content is not less than 5 atm %, it may be difficult to obtain particles having a well-controlled particle size, and the use of such a large amount of Co is uneconomical.

The spindle-shaped magnetic metal particles containing iron as a main component according to the present invention also contain Al in an amount of usually from 5 to 110 atm %, preferably from 5.5 to 9.5 atm % based on whole Fe; and a rare earth element in an amount of usually from 1.5 to 5 atm %, preferably from 2.0 to 4.8 atm % based on whole Fe. An atomic ratio value of Al to Co is usually from 1.0 to less than 2.0, preferably 1.1 to 1.9.

When the Al content is less than 5 atm %, it may be difficult to adequately control a coercive force of the obtained particles, especially those particles having a small particle size, since the coercive force becomes too large. When the Al content is more than 10 atm %, it also may become difficult to attain a well-controlled coercive force because the particles have a relatively low aspect ratio. When the rare earth content is less than 1.5 atm %, a sufficient anti-sintering effect may not be obtained. Further, the obtained magnetic metal particles may be deteriorated in size distribution, resulting in deteriorated SFD of magnetic coating film obtained therefrom. When the rare earth content is more than 5 atm %, the saturation magnetization of the obtained particles is considerably reduced. When the atomic ratio value of Al to Co is not less than 2, it also may become difficult to attain a well-controlled coercive force because the particles have a relatively low aspect ratio.

The spindle-shaped magnetic metal particles containing iron as a main component according to the present invention have an average major axis diameter of usually from 0.05 to less than 0.15 µm, preferably 0.06 to 0.14 µm. When the average major axis diameter is less than 0.05 µm, the obtained magnetic metal particles have a too small particle size and, therefore, may tend to be deteriorated in saturation magnetization and coercive force as well as dispersibility in coating composition, so that the oxidation stability of the magnetic coating film obtained therefrom may tend to be deteriorated. When the average major axis diameter is not less than 0.15 µm, it may be difficult to obtain the aimed coercive force. In addition, since the particle size becomes too large, the obtained magnetic coating film may tend to be deteriorated in surface smoothness, resulting in poor output characteristics thereof.

The spindle-shaped magnetic metal particles containing iron as a main component according to the present invention have a crystallite size $D_{110}$ of usually from 150 to less than 170 Å, preferably 150 to 165 Å. When the crystallite size $D_{110}$ is less than 150 Å, although the noise of obtained magnetic recording media due to the particles is suitably reduced, the magnetic recording media may tend to be deteriorated in saturation magnetization and oxidation stability. When the crystallite size $D_{110}$ is not less than 170 Å, the noise due to the particles may be increased.

The spindle-shaped magnetic metal particles containing iron as a main component according to the present invention have a BET specific surface area (S) satisfying the formula:

$$S \leq -160 \times L + 65;$$

wherein L represents an average major axis diameter of the particles.

When the BET specific surface area exceeds the value calculated from the above formula, the obtained magnetic metal particles containing iron as a main component fail to show an excellent oxidation stability. The lower limit of the BET specific surface area is preferably 30 m²/g. When the BET specific surface area is less than 30 m²/g, the obtained magnetic metal particles may be already sintered upon the previous heat-reduction treatment, so that it may become difficult to improve the squareness of the magnetic coating film obtained therefrom.

The spindle-shaped magnetic metal particles containing iron as a main component according to the present invention have a size distribution (standard deviation/average major axis diameter) of usually not more than 0.30, preferably 0.10 to 0.28. The size distribution of the spindle-shaped magnetic metal particles containing iron as a main component according to the present invention is preferably as small as possible. Although the lower limit of the size distribution is not particularly restricted, in the consideration of industrial productivity, the lower limit of the size distribution is suitably about 0.10. When the size distribution is more than 0.30, the obtained particles may tend to be deteriorated in oxidation stability, so that the magnetic coating film obtained therefrom may tend to be deteriorated in SFD, thereby failing to attain a high density recording performance thereof.

The spindle-shaped magnetic metal particles containing iron as a main component according to the present invention have an aspect ratio of usually 4:1 to 8:1, preferably 5:1 to 8:1. When the aspect ratio is less than 4:1, there is a tendency that the spindle-shaped magnetic metal particles cannot show the aimed coercive force, and the magnetic coating film obtained therefrom may be deteriorated in both squareness ratio and orientation ratio. When the aspect ratio is more than 8:1, the obtained particles may tend to exhibit a too high coercive force or be deteriorated in oxidation stability.

The spindle-shaped magnetic metal particles containing iron as a main component according to the present invention have a coercive force Hc of usually 111.4 to 143.2 kA/m (1,400 to 1,800 Oe), preferably 117.8 to 143.2 kA/m (1480 to 1800 Oe); and a saturation magnetization as of usually 120 to 140 Am²/kg (120 to 140 emu/g), preferably 120 to 135 Am²/kg (120 to 135 emu/g).

The spindle-shaped magnetic metal particles containing iron as a main component according to the present invention have an oxidation stability (Δσs) of saturation magnetization (σs) of usually not more than 5.0%, preferably 0.1 to 5.0%, as an absolute value, and an ignition temperature of usually not less than 140° C., preferably 140 to 180° C., when measured after one-week accelerated deterioration test at a temperature of 60° C., and a relative humidity of 90%. When the oxidation stability of saturation magnetization and the ignition temperature is out of the above-specified range, the obtained particles fail to show a sufficient oxidation stability.

As to properties of a coating film produced using the spindle-shaped magnetic metal particles containing iron as a main component according to the present invention, when the coating film is oriented by applying a magnetic field of 397.9 kA/m (5 kOe) thereto, the squareness (Br/Bm) thereof is usually not less than 0.84, preferably not less than 0.845; the orientation property (OR) thereof is usually not less than 2.8, preferably not less than 3.00; and the coercive force distribution (SFD) thereof is usually not more than 0.53, preferably not more than 0.526.

The magnetic coating film produced using the spindle-shaped magnetic metal particles containing iron as a main component according to the present invention, have an oxidation stability (ΔBm) of usually not more than 4.0%, preferably 0.5 to 4.0%, when the magnetic coating film is oriented by applying a magnetic field of 397.9 kA/m (5 kOe) thereto.

Next, the process for producing the spindle-shaped magnetic metal particles containing iron as a main component according to the present invention is described below.

The spindle-shaped magnetic metal particles of the present invention can be produced by the process comprising the first step of producing spindle-shaped goethite particles; the second step of heat-dehydrating the spindle-shaped goethite particles to obtain spindle-shaped hematite particles; and the third step of heat-reducing the spindle-shaped hematite particles.

The first step of producing the spindle-shaped goethite particles is described below.

The spindle-shaped goethite particles are produced by forming spindle-shaped goethite seed crystal particles and then growing a goethite layer on the surface of respective goethite seed crystal particles.

The production conditions of spindle-shaped goethite seed crystal particles are as follows. That is, upon the production of the spindle-shaped goethite seed crystal particles by reacting an aqueous ferrous salt solution with admixed aqueous alkali solution of an aqueous alkali carbonate solution and an aqueous alkali hydroxide solution to form a water suspension containing a ferrous-containing precipitate; aging the resultant water suspension in a non-oxidative atmosphere; and then passing an oxygen-containing gas through the water suspension to conduct an oxidation reaction thereof, a Co compound is added in an amount of usually from 0.5 to less than 5 atm % (calculated as Co) based on whole Fe, to the water suspension containing the ferrous-containing precipitate during aging of the water suspension but prior to the elapse of 20% of the whole aging time before initiation of the oxidation reaction, and then the oxidation reaction is conducted such that usually 30 to 50% of whole $Fe^{2+}$ contained in spindle-shaped goethite particles is oxidized.

When the Co compound is added after the elapse of 20% of the whole aging time, the obtained goethite particles fail to show the aimed particle size and aspect ratio. In addition, when the oxidation percentage of whole $Fe^{2+}$ upon the oxidation reaction is less than 30% and more than 50%, it may be also difficult to obtain goethite particles having the aimed particle size and aspect ratio.

The aging of the water suspension is preferably conducted at a temperature of 40 to 80° C. in a non-oxidative atmosphere. When the aging temperature is less than 40° C. a sufficient aging effect may not be attained, so that the obtained particles may have a small aspect ratio. When the aging temperature is more than 80° C., magnetite particles tend to be mixed in the aimed goethite seed crystal particles. The aging time is usually 30 to 300 minutes. When the aging time is less than 30 minutes and more than 300 minutes, it may become difficult to obtain particles having the aimed aspect ratio. In order to produce the non-oxidative atmosphere, an inert gas such as nitrogen or a reducing gas such as hydrogen may be passed though a reactor containing the water suspension.

As the aqueous ferrous salt solution used in the production reaction of the spindle-shaped goethite seed crystal particles, there may be used an aqueous ferrous sulfate solution, an aqueous ferrous chloride solution or the like. These solutions may be used singly or in the form of a mixture of any two or more thereof.

The mixed aqueous alkali solution used in the production reaction of the spindle-shaped goethite seed crystal particles may be produced by mixing an aqueous alkali carbonate solution with an aqueous alkali hydroxide solution. The mixing ratio between the alkali hydroxide and the alkali carbonate (% calculated as normality) is adjusted such that the concentration of the alkali hydroxide is preferably 10 to 40%, more preferably 15 to 35% (calculated as normality). When the concentration of the alkali hydroxide contained in the mixed aqueous solution is less than 10%, there is a tendency that particles having the aimed aspect ratio may not be obtained. When the concentration of the aqueous alkali hydroxide solution is more than 40%, granular magnetite particles may tend to be mixed in the aimed spindle-shaped goethite seed crystal particles.

As the aqueous alkali carbonate solution, there may be used an aqueous sodium carbonate solution, an aqueous potassium carbonate solution, an aqueous ammonium carbonate solution or the like. As the aqueous alkali hydroxide solution, there may be used an aqueous sodium hydroxide solution, an aqueous potassium hydroxide solution or the like. These solutions may be respectively used singly or in the form of a mixture of any two or more thereof.

As to the amount of the mixed aqueous alkali solution used, the equivalent ratio of alkali contained therein to whole Fe contained in the aqueous ferrous salt solution, is usually 1.3:1 to 3.5:1, preferably 1.5:1 to 2.5:1. When the equivalent ratio is less than 1.3:1, magnetite particles may tend to be mixed in the aimed spindle-shaped goethite particles. When the equivalent ratio is more than 3.5:1, the use of such a large equivalent ratio is industrially disadvantageous.

The ferrous concentration of the solution obtained by mixing the aqueous ferrous salt solution with the mixed aqueous alkali solution is usually 0.1 to 1.0 mol/liter, preferably 0.2 to 0.8 mol/liter. When the ferrous concentration is less than 0.1 mol/liter, the yield of the aimed particles may be lowered, resulting in industrially disadvantageous process. When the ferrous concentration is more than 1.0 mol/liter, the particle size distribution of the obtained particles may become too broad.

The pH value of the solution used in the production reaction of the spindle-shaped goethite seed crystal particles is usually 8.0 to 11.5, preferably 8.5 to 11.0. When the pH value is less than 8.0, a large amount of acid radicals may be contained in the obtained goethite particles. Since the acid radicals cannot be simply removed by ordinary washing method, the goethite particles may tend to be sintered together when heat-treated to form the magnetic metal particles. When the pH value is more than 11.5, the obtained particles may tend to fail to exhibit the aimed coercive force.

The production reaction of the spindle-shaped goethite seed crystal particles is conducted by the oxidation reaction, more specifically, by passing an oxygen-containing gas such as air through the solution.

The superficial velocity of the oxygen-containing gas is usually 2.3 to 3.5 cm/s. When the superficial velocity is less than 2.3 cm/s, the oxidation velocity is low, so that granular magnetite particles may tend to be mixed in the aimed spindle-shaped seed crystal particles, and it may become difficult to control the particles size as required. When the superficial velocity is more than 3.5 cm/s, the oxidation velocity is too high, so that it may become difficult to control the particle size as required. Here, the "superficial velocity" means an amount of the oxygen-containing gas passed through the reactor per its unit sectional area (bottom sectional area of a cylindrical reactor where the pore diameter and pore number of a perforated plate are ignored; unit: cm/sec).

The production reaction of the spindle-shaped goethite seed crystal particles may be conducted at a temperature of usually not more than 80° C. at which goethite particles may be ordinarily produced. When the reaction temperature is more than 80° C., magnetite particles may tend to be mixed in the aimed spindle-shaped goethite particles. The reaction temperature is preferably 45 to 55° C.

As the Co compound added in the production reaction of the spindle-shaped goethite seed crystal particles, there may be used cobalt sulfate, cobalt chloride, cobalt nitrate or the like. These Co compounds may be used alone or in the form of a mixture of any two or more thereof. The Co compound is added to the water suspension containing the ferrous-containing precipitate during the aging time thereof before initiation of the oxidation reaction.

The amount of the Co compound added is usually from 0.5 to less than 5 atm % based on whole Fe contained in the spindle-shaped goethite particles as a final product.

The pH value of the water suspension used in the growth reaction of the goethite layer is usually 8.0 to 11.5, preferably 8.5 to 11.0. When the pH value is less than 8.0, a large amount of acid radicals may be contained in the obtained goethite particles. Since such acid radicals cannot be simply removed by ordinary washing method, the goethite particles may tend to be sintered together when heat-treated to form magnetic metal particles. When the pH value is more than 11.5, it may tend to be difficult to obtain particles having the aimed particle size distribution.

The growth of the goethite layer is conducted by the oxidation reaction, more specifically, by passing an oxygen-containing gas such as air though the water suspension. The superficial velocity of the oxygen-containing gas used in the growth reaction of the goethite layer is preferably larger than that used in the production reaction of the seed crystal particles, in the range of usually from more than 2.3 to 3.5 cm/s. When the superficial velocity used in the growth reaction of the goethite layer is not larger than that used in the production reaction of the seed crystal particles, the viscosity of the water suspension may be increased upon adding Al thereto. As a result, the growth in the minor axis direction is more remarkably accelerated, so that the aspect ratio may be decreased, thereby failing to obtain particles having the aimed aspect ratio.

The growth reaction of the goethite layer may be conducted at a temperature of usually not more than 80° C., at which goethite particles can be produced. When the growth reaction temperature is more than 80° C., magnetite particles may tend to be mixed in the aimed goethite particles. The growth reaction temperature is preferably 45 to 55° C.

As the Al compound added in the growth reaction of the goethite layer, there may be used acid salts such as, aluminum sulfate, aluminum chloride and aluminum nitrate; and aluminates such as sodium aluminate, potassium aluminate and ammonium aluminate. These Al compounds may be used alone or in the form of a mixture of any two or more thereof.

In the growth reaction of the goethite layer, the addition of the Al compound may be conducted simultaneously with passing the oxygen-containing gas through the water suspension at such a superficial velocity preferably larger than that used in the production reaction of the seed crystal particles in the range of usually from more than 2.3 to 3.5 cm/s.

When the addition of the Al compound requires a long period of time, the oxygen-containing gas may be replaced with a nitrogen-containing gas so as not to accelerate the oxidation reaction. Meanwhile, in the above case, when the Al compound is added in separate parts, continuously or intermittently while passing the oxygen-containing gas through the water suspension, it is not possible to sufficiently attain the effects of the present invention.

The amount of the Al compound added is usually from 5 to 10 atm %, preferably 5.5 to 9.5 atm % based on whole Fe contained in the spindle-shaped goethite particles as a final product.

The thus obtained spindle-shaped goethite particles have a cobalt content of usually from 0.5 to less than 5 atm %, preferably from 1.0 to 4.8 atm % based on whole Fe, and an Al content of usually from 5 to 10 atm %, preferably from 5.5 to 9.5 atm % based on whole Fe.

When the Co content of the spindle-shaped goethite particles is less than 0.5 atm %, the effect of improving magnetic properties cannot be obtained when the magnetic metal particles are produced therefrom. When the Co content is not less than 5 atm %, it may be difficult to adequately control the particle size, and the use of such a large amount of Co is economically disadvantageous. When the Al content is less than 5 atm %, although the anti-sintering effect is attained, the coercive force of the obtained particles, especially those having a small particle size, may become too large, thereby failing to adequately control the coercive force. When the Al content is more than 10 atm %, it may be difficult to adequately control the coercive force because the particles have a relatively small aspect ratio.

The spindle-shaped goethite particles used in the present invention are of a spindle shape, and have an average major axis diameter of usually 0.05 to 0.18 $\mu$m, preferably 0.07 to 0.17 $\mu$m; a size distribution (standard deviation/average major axis diameter) of usually not more than 0.20, preferably 0.10 to 0.196; and an aspect ratio (average major axis diameter/average minor axis diameter) of usually from 4:1 to 8:1, preferably 5:1 to 8:1.

When the average major axis diameter of the spindle-shaped goethite particles is less than 0.05 $\mu$m, the magnetic metal particles obtained therefrom have a too small particle size and, therefore, may tend to be deteriorated in saturation magnetization, coercive force, dispersibility in coating composition, and oxidation stability. When the average major axis diameter of the spindle-shaped goethite particles is more than 0.18 $\mu$m, it may be difficult to obtain the aimed coercive force. Further, the obtained coating film may tend to be deteriorated in surface smoothness due to the large particle size, thereby failing to improve the output characteristics thereof.

The spindle-shaped goethite particles preferably have a size distribution-as small as possible. Although the lower limit of the size distribution of the spindle-shaped goethite particles is not particularly restricted, in the consideration of industrial productivity, the lower limit thereof is preferably about 0.10. When the size distribution of the spindle-shaped goethite particles is more than 0.20, the magnetic metal particles obtained therefrom may tend to be deteriorated in oxidation stability, thereby failingt to achieve a high density recording performance of magnetic recording media. When the aspect ratio of the spindle-shaped goethite particles is less than 4:1, the aimed coercive force may not be obtained. When the aspect ratio is more than 8:1, the obtained particles may exhibit a too high coercive force or may be deteriorated in oxidation stability.

In addition, the spindle-shaped goethite particles used in the present invention have a BET specific surface area of usually 100 to 160 m$^2$/g, preferably 120 to 160 m$^2$/g. When the BET specific surface area is less than 100 m$^2$/g, the obtained spindle-shaped goethite particles are relatively large in size, so that the magnetic metal particles containing iron as a main component obtained therefrom may tend to fail to exhibit the aimed coercive force. When the BET specific surface area is more than 160 m$^2$/g, the coercive force of the spindle-shaped magnetic metal particles containing iron as a main component obtained from the spindle-shaped goethite particles may become so high beyond required level, resulting in deteriorated oxidation stability.

The spindle-shaped goethite particles used in the present invention have a crystallite size $D_{020}$ of usually 100 to 200 Å, preferably 120 to 200 Å; a crystallite size $D_{110}$ of usually 90 to 130 Å, preferably 100 to 125 Å; and a crystallite size ratio $D_{020}/D_{110}$ of usually less than 1.8, preferably not more than 1.78. When the crystallite size ratio $D_{020}/D_{110}$ is not less than 1.8, magnetic metal particles containing iron as a main component obtained from such goethite particles have the aimed particle size, but may tend to fail to exhibit the aimed coercive force.

The spindle-shaped goethite particles used in the present invention are each constituted by a seed crystal portion and a surface layer portion. Cobalt is present in both the seed crystal and surface layer portions, while aluminum is present only in the surface layer portion.

Here, the "seed crystal portion" means a goethite seed crystal particle produced by oxidizing a part of the ferrous salt added, prior to the addition of the Al compound. More specifically, the seed crystal portion is a portion having a specific weight percentage of Fe determined by the oxidation percentage of $Fe^{2+}$, preferably a portion extending outwardly from the center of each goethite particle which contains Fe in an amount of 30 to 50% by weight based on whole Fe contained in the goethite particle.

Next, the second step of producing the spindle-shaped hematite particles is described below.

In the present invention, the surface of the respective spindle-shaped goethite particles is preferably preliminarily coated with an anti-sintering agent prior to the heat-dehydration treatment thereof, and the obtained spindle-shaped goethite particles are heat-treated at a temperature of usually 650 to 800° C. in a non-reducing atmosphere, thereby obtaining spindle-shaped hematite particles.

As the anti-sintering agent, there may be used rare earth compounds. Examples of the suitable rare earth compounds may include compounds of at least one element selected from the group consisting of scandium, yttrium, lanthanum, cerium, praseodymium, neodymium and samarium. Also, there may be used such rate earth compounds in the form of chlorides, sulfates, nitrates or the like. The coating of the rare earth compound may be conducted by either dry or wet method. Of these methods, the use of wet coating method is preferred.

The amount of the rare earth compound used is usually 1.5 to 5 atm %, preferably 2.0 to 4.8 atm % based on whole Fe.

By preliminarily coating the surface of the respective goethite particles with the anti-sintering agent, it is possible not only to inhibit the sintering within each particle and sintering between particles, but also to allow the spindle-shape hematite particles to more analogously retain the particle shape and-aspect ratio of the spindle-shaped goethite particles, thereby ensuring the production of individual spindle-shaped magnetic metal particles containing iron as a main component which can also retain the shape, etc. of the starting spindle-shaped goethite particles.

The spindle-shaped goethite particles coated with the anti-sintering agent may be heat-treated at a temperature of 650 to 800° C. in a non-reducing atmosphere. In this case, it is preferred that the heat-treatment is conducted such that the ratio of crystallite size $D_{104}$ of the obtained spindle-shaped hematite particles to crystallite size $D_{110}$ of the spindle-shaped goethite particles [$D_{104}$(hematite)/$D_{110}$(goethite))] is within the range of 1.0 to 1.3.

When the heat-treating temperature is less than 650° C., the crystallite size ratio: $D_{104}$(hematite)/$D_{110}$(goethite) may tend to become less than 1.0. As a result, the magnetic metal particles obtained from such spindle-shaped hematite particles may tend to show a broad particle size distribution, so that the coating film produced therefrom may tend to be deteriorated in SFD. When the heat-treating temperature is more than 800° C., the crystallite size ratio: $D_{104}$(hematite)/$D_{110}$(goethite) may tend to be more than 1.3. Therefore, the obtained hematite particles may tend to suffer from shape breakage and sintering. As a result, the magnetic metal particles obtained from such hematite particles also may tend to show a broad particle size distribution and include sintered portions therein, and the magnetic coating film produced therefrom may tend to be deteriorated in both squareness and SFD.

After the heat-treatment, the obtained hematite particles may be rinsed in order to remove impurity salts such as $Na_2SO_4$ therefrom. In this case, the rinsing is preferably conducted so as to remove only undesired impurity salts without elution of the anti-sintering agent coated. More specifically, the rinsing can be effectively performed under a high pH condition in order to remove cationic impurities, and under a low pH condition in order to remove anionic impurities.

The thus obtained spindle-shaped hematite particles contain Co in an amount of usually from 0.5 to less than 5 atm %, preferably from 1.0 to 4.8 atm % based on whole Fe; Al in an amount of usually from 5 to 10 atm %, preferably from 5.5 to 9.5 atm % based on whole Fe; and a rare earth element in an amount of usually from 1.5 to 5 atm %, preferably from 2.0 to 4.8 atm % based on whole Fe. The reasons why the Al and Co contents of the spindle-shaped hematite particles are defined to the above ranges, are the same as those described above as to the Al and Co contents of the goethite particles. When the rare earth element content of the spindle-shaped hematite particles is less than 1.5 atm %, a sufficient anti-sintering effect may not be obtained. As a result, the magnetic metal particles obtained from such hematite particles may be deteriorated in size distribution, and further the magnetic coating film produced therefrom may be deteriorated in SFD. When the rare earth element content is more than 5 atm %, the saturation magnetization of the obtained particles may be remarkably deteriorated.

The spindle-shaped hematite particles used in the present invention are of a spindle shape, and have an average major axis diameter of usually 0.05 to 0.17 μm, preferably 0.07 to 0.17 μm; a size distribution (standard deviation/average-major axis diameter) of usually not more than 0.22, preferably 0.10 to 0.21; and an aspect ratio of usually from 4:1 to 9:1, preferably 5:1 to 9:1.

When the average major axis diameter of the spindle-shaped hematite particles is less than 0.05 μm, the magnetic metal particles obtained therefrom have a too small particle size and, therefore, may tend to be deteriorated in saturation magnetization and coercive force, dispersibility in coating composition and oxidation stability. When the average major axis diameter of the spindle-shaped hematite particles is more than 0.17 μm, it may be difficult to attain the aimed coercive force when the aspect ratio lies within the above-specified range. In addition, since the particle size becomes too large, the obtained magnetic coating film may tend to be deteriorated in surface smoothness, resulting in poor output characteristics thereof.

The spindle-shaped hematite particles used in the present invention preferably have a size distribution as small as possible. Although the lower limit of the size distribution is not particularly restricted, in the consideration of industrial productivity, the lower limit is preferably about 0.10. When the size distribution of the spindle-shaped hematite particles is more than 0.22, the obtained particles may tend to be deteriorated in oxidation stability, thereby failing to obtain magnetic recording media having a high density recording performance. When the aspect ratio is less than 4:1, the aimed coercive force may not be obtained. When the aspect ratio is more than 9, the obtained particles may tend to exhibit a too high coercive force or be deteriorated in oxidation stability.

The spindle-shaped hematite particles used in the present invention have a BET specific surface area of usually from 35 to less than 60 $m^2/g$, more preferably 35 to 55 $m^2/g$. When the BET specific surface area is less than 35 $m^2/g$, the obtained hematite particles having the particle size specified by the present invention are already sintered upon the heat-treatment and, therefore, may tend to be deteriorated in size distribution. As a result, the magnetic metal particles obtained from such hematite particles also may tend to be deteriorated in size distribution, and further the magnetic coating film produced using the magnetic metal particles tend to be deteriorated in SFD. When the BET specific surface area is not less than 60 $m^2/g$, the anti-sintering effect may become insufficient upon the heat-reduction treatment. As a result, the magnetic metal particles obtained from such hematite particles may tend to be deteriorated in size distribution, and further the magnetic coating film produced therefrom may tend to be deteriorated in SFD.

The spindle-shaped hematite particles used in the present invention have a crystallite size $D_{104}$ of usually 120 to 160 Å, preferably 120 to 150 Å; a crystallite size $D_{110}$ of usually 200 to 300 Å, preferably 220 to 280 Å; and a crystallite size ratio $D_{110}/D_{104}$ of usually 1.8 to 2.2, more preferably 1.8 to 2.1. When the crystallite size ratio $D_{110}/D_{104}$ is less than 1.8, excessive crystal growth of particles may tend to be caused upon the heat-dehydration treatment. Therefore, the obtained particles may tend to be deteriorated in particle size distribution in addition to the accelerated growth in the minor axis direction. As a result, the magnetic metal particles obtained from the hematite particles may tend to be lowered in coercive force and deteriorated in dispersibility. When the crystallite size ratio $D_{110}/D_{104}$ of the spindle-shaped hematite particles is more than 2.2, the crystal growth upon the heat-dehydration treatment may be insufficient, so that a good shape-retention effect may not be expected upon the heat-reduction treatment. As a result, the obtained particles may tend to be deteriorated in coercive force and particle size distribution.

The spindle-shaped hematite particles used in the present invention are each constituted by a core crystal portion (hematite core particle), an intermediate layer portion (hematite layer) and an outer layer portion (surface layer). Cobalt is present in both the core crystal and intermediate layer portions, while aluminum is present only in the intermediate layer portion and the rare earth element is present only in the outer layer portion.

Here, the "core crystal portion" of the respective hematite particles corresponds to the seed crystal portion of the above goethite particles. The core crystal portion is preferably a portion extending outwardly from the center of each hematite particle which corresponds to such a portion containing Fe in an amount of usually 30 to 50% by weight based on whole Fe contained in each hematite particle. The "intermediate layer portion" of the respective hematite particles corresponds to the surface layer portion of the above goethite particles. The intermediate layer portion is preferably a portion extending inwardly from the inner surface of the rare earth element-containing outer layer up to the outer surface of the core crystal portion, which corresponds to such a portion containing Fe in an amount of usually 50 to 70% by weight based on whole Fe contained in each hematite particle.

In the third step of the process of the present invention, the spindle-shaped hematite particles are introduced into a reducing. apparatus to form a fixed-bed thereof. The fixed-bed of the spindle-shaped hematite particles is heat-reduced to obtain spindle-shaped magnetic metal particles containing iron as a main component.

In the present invention, upon forming the fixed-bed, the spindle-shaped hematite particles are preferably granulated by an ordinary method to form granulated particles having an average particle size of 1 to 5 mm.

As the preferred reducing apparatus usable in the present invention for forming the fixed-bed therein, there may be exemplified a moving-type (continuous-type) reducing apparatus-including a belt or tray on which the fixed-bed is formed. In the reducing apparatus of this type, the hematite particles are reduced while moving the belt or tray on which the fixed-bed thereof is formed.

The fixed-bed of the granulated spindle-shaped hematite particles has a height of usually 3 to 15 cm, preferably 4 to 14 cm. When the height of the fixed-bed is more than 15 cm, the increase of water vapor partial pressure may be caused by abrupt reduction of the spindle-shaped hematite particles located at lower portion of the fixed-bed. This causes problems such as deterioration in coercive force of the particles located at an upper portion of the fixed-bed, resulting in deterioration in magnetic properties as a whole. When the height of the fixed-bed is less than 3 cm, the granulated particles may tend to be sometimes scattered around though it depends upon the superficial velocity of gas introduced.

In the present invention, the atmosphere used during heating to a reducing temperature of 400 to 700° C. is a reducing gas atmosphere. As the reducing gas, hydrogen is suitably used. If an atmosphere other than the reducing gas atmosphere, especially an inert gas atmosphere such as nitrogen, is used, abrupt reduction may tend to be caused when the atmosphere is changed over to the reducing gas atmosphere at the subsequent reducing step after heating. As a result, the uniform particle growth may be inhibited, thereby failing to attain a high coercive force.

In the present invention, the superficial velocity of the reducing gas at the above heating step is usually 40 to 150 cm/s, preferably 40 to 140 cm/s. When the superficial velocity of the reducing gas is less than 40 cm/s, the water vapor produced by the reduction of the hematite particles may be discharged out of the system at a too low velocity, thereby causing deterioration in coercive force of the particles located at an upper portion of the fixed-bed and in SFD of the coating film produced therefrom. As a result, the coercive force of the obtained particles may tend to be deteriorated as a whole. When the superficial velocity of the reducing gas is more than 150 cm/s, although the aimed spindle-shaped magnetic alloy particles can be obtained, there may tend to be caused problems such as high reducing temperature and shape breakage of the granulated particles by scattering.

In the present invention, the temperature-rising rate used upon the heating step is usually 10 to 80° C.)/minute, preferably 20 to 70° C./minute. When the temperature-rising rate is less than 10° C./minute, the reduction of the fixed-bed proceeds slowly from a lower portion thereof in a low temperature range. Therefore, the obtained magnetic metal particles may tend to have an extremely small crystallite size, and the water vapor produced may tend to be discharged out of the system at an extremely low velocity, resulting in deterioration in coercive force of particles located at the upper portion of the fixed-bed, SFD-of the obtained coating film in addition to deterioration in crystallinity of particles located at the lower portion of the fixed-bed. As a result, it is difficult to obtain magnetic metal particles having a high coercive force as a whole. When the temperature-rising rate is more than 80° C./minute, the attitude of the heat treatment may become close to that conducted in nitrogen, thereby causing abrupt reduction as well as the transfer into $\alpha$-Fe due to the relatively high water vapor partial pressure. As a result, the obtained magnetic metal particles may tend to have a large crystallite size and be deteriorated in coercive force, thereby causing deterioration in SFD of the coating film produced therefrom.

The atmosphere used in the heat-reduction of the present invention is a reducing gas atmosphere. As the reducing gas, hydrogen may be suitably used.

The heat-reducing temperature is in the range of 400 to 700° C., preferably 400 to 600° C. When the heat-reducing temperature is less than 400° C., the reduction reaction proceeds too slowly and, therefore, requires a long period of time. When the heat-reducing temperature is more than 700° C., the reduction reaction proceeds abruptly, thereby sometimes causing shape breakage of the particles and sintering within particles or between particles.

The spindle-shaped magnetic metal particles containing iron as a main component which are obtained after the heat-reduction, may be taken out in air by known methods, for example, a method of immersing the particles in an organic solvent such as toluene; a method of temporarily replacing the atmosphere around the heat-reduced spindle-shaped magnetic metal particles containing iron as a main component, with an inert gas, and then gradually increasing the oxygen content of the inert gas until the inert gas is completely replaced with air; and a method of gradually oxidizing the particles using a mixed gas of oxygen and water vapor.

Next, the magnetic recording medium according to the present invention will be described.

The magnetic recording medium according to the present invention comprises a non-magnetic substrate, and a magnetic recording layer which is formed on the non-magnetic substrate and comprising the magnetic metal particles containing iron as a main component and a binder resin.

As the non-magnetic substrate, there may be used those ordinarily used for magnetic recording media. Examples of the non-magnetic substrates may include films of synthetic resins such as polyethylene terephthalate, polyethylene, polypropylene, polycarbonates, polyethylene naphthalate, polyamides, polyamideimides and polyimides; foils or plates of metals such as aluminum and stainless steel; or various kinds of papers. The thickness of the non-magnetic substrate varies depending upon materials used, and is usually 1.0 to 300 $\mu$m, preferably 2.0 to 200 $\mu$m.

As the non-magnetic substrate for magnetic discs, there may be generally used a polyethylene terephthalate film having a thickness of usually 50 to 300 $\mu$m, preferably 60 to 200 $\mu$m. As the non-magnetic substrate for magnetic tapes, there may be used a polyethylene terephthalate film having a thickness of usually 3 to 100 $\mu$m, preferably 4 to 20 $\mu$m, a polyethylene naphthalate film having a thickness of usually 3 to 50 $\mu$m, preferably 4 to 20 $\mu$m, or a polyamide film having a thickness of usually 2 to 10 $\mu$m, preferably 3 to 7 $\mu$m.

As the binder resins, there may also be used those presently ordinarily used for the production of magnetic recording media. Examples of the binder resins may include vinyl chloride-vinyl acetate copolymer resins, urethane resins, vinyl chloride-vinyl acetate-maleic acid copolymer resins, urethane elastomers, butadiene-acrylonitrilpe copolymer resins, polyvinyl butyral, cellulose derivatives such as nitrocellulose, polyester resins, synthetic rubber-based resins such as polybutadiene, epoxy resins, polyamide resins, polyisocyanates, electron beam-curable acrylic urethane resins, or mixtures thereof.

The respective binder resins may contain a functional group such as —OH, —COOH, —SO$_3$M, —OPO$_2$M$_2$ and —NH$_2$ wherein M represents H, Na or K. In the consideration of the dispersibility of the magnetic metal particles containing iron as a main component in vehicle upon the production of a magnetic coating composition, the use of such binder resins containing —COOH or —SO$_3$M as a functional group is preferred.

The thickness of the magnetic recording layer formed on the non-magnetic substrate is usually 0.01 to 5.0 $\mu$m. If the thickness is less than 0.01 $\mu$m, uniform coating may be difficult, so that unfavorable phenomenon such as unevenness on the coating surface may be observed. On the contrary, when the thickness of the magnetic recording layer is more than 5.0 $\mu$m, it may be difficult to obtain desired electromagnetic performance due to an influence of diamagnetism. The thickness of the magnetic recording layer is preferably 0.05 to 4.0 $\mu$m.

The amount of the magnetic metal particles containing iron as a main component in the magnetic recording layer is usually 5 to 2,000 parts by weight, preferably 100 to 1,000 parts by weight based on 100 parts by weight of the binder resin.

When the amount of the magnetic metal particles containing iron as a main component is less than 5 parts by weight, the magnetic metal particles containing iron as a main component may not be continuously dispersed in a coating layer due to the too small content in a magnetic coating composition, resulting in insufficient surface smoothness and strength of the obtained coating layer. When the amount of the magnetic metal particles containing iron as a main component is more than 2,000 parts by weight, the magnetic metal particles containing iron as a main component may not be uniformly dispersed in the magnetic coating composition due to the too large content as compared to that of the binder resin. As a result, when such a magnetic coating composition is coated onto the substrate, it is difficult to obtain a coating film having a sufficient surface smoothness. Further, since the magnetic metal particles containing iron as a main component cannot be sufficiently bonded together by the binder resin, the obtained coating film becomes brittle.

The magnetic recording layer may further contain various additives used in ordinary magnetic recording media such as lubricants, abrasives and anti-static agents in an amount of 0.1 to 50 parts by weight based on 100 parts by weight of the binder resin.

The magnetic recording medium of the present invention has a coercive force value of usually 111.4 to 143.2 kA/m (1,400 to 1,800 Oe), and when the magnetic coating film is oriented by applying a magnetic field of 397.9 kA/m (5 koe) thereto, a squareness (Br/Bm) of usually not less than 0.84, an orientation property,(OR) of usually not less than 2.8, a coercive force distribution (Switching Field Distribution: SFD) of usually not more than 0.53 and an oxidation stability (ΔBm) of usually not more than 4.0%.

The magnetic recording medium of the another aspect in the present invention, comprises a non-magnetic base film, a non-magnetic undercoat layer formed on the non-magnetic base film comprising a binder resin and non-magnetic particles, and a magnetic recording layer formed on the non-magnetic undercoat layer, comprising a binder resin and the spindle-shaped magnetic metal particles containing iron as a main component.

The thickness of the non-magnetic undercoat layer is preferably 0.2 to 10.0 μm. When the thickness of the non-magnetic undercoat layer is less than 0.2 μm, it may be difficult to improve the surface roughness of the non-magnetic substrate, and the stiffness of a coating film formed thereon tends to be unsatisfactory. In the consideration of reduction in total thickness of the magnetic recording medium as well as the stiffness of the coating film, the thickness of the non-magnetic undercoat layer is more preferably in the range of 0.5 to 5.0 μm.

As the binder resin, the same binder resin as that used for the production of the magnetic recording layer is usable.

The mixing ratio of the non-magnetic particles to the binder resin is usually 5 to 2000 parts by weight, preferably 100 to 1000 parts by weight based on 100 parts by weight of the binder resin.

When the content of the non-magnetic particles is as small as less than 5 parts by weight, such a non-magnetic undercoat layer in which the non-magnetic particles are uniformly and continuously dispersed may not be obtained upon coating, resulting in insufficient surface smoothness and insufficient stiffness of the non-magnetic substrate. When the content of the non-magnetic particles is more than 2,000 parts by weight, the non-magnetic particles may not be sufficiently dispersed in a non-magnetic coating composition since the amount of the non-magnetic particles is too large as compared to that of the binder resin. As a result, when such a non-magnetic coating composition is coated onto the non-magnetic base film, it may become difficult to obtain a coating film having a sufficiently smooth surface. Further, since the non-magnetic particles may not be sufficiently bonded together through the binder resin, the obtained coating film tends to become brittle.

It is possible to add an additive such as a lubricant, a polishing agent, an antistatic agent, etc. which are generally used for the production of a magnetic recording medium, to the non-magnetic undercoating layer. The mixing ratio of the additive to the binder resin is preferably 0.1 to 50 parts by weight based on 100 parts. by weight of the binder resin.

As the non-magnetic particles used in the non-magnetic undercoat layer of the present invention, there may be exemplified non-magnetic inorganic particles ordinarily used for forming a non-magnetic undercoat layer in conventional magnetic recording media. Specific examples of the non-magnetic particles may include hematite particles, iron oxide hydroxide particles, titanium oxide particles, zinc oxide particles, tin oxide particles, tungsten oxide particles, silicon dioxide particles, α-alumina particles, β-alumina particles, γ-alumina particles, chromium oxide particles, cerium oxide particles, silicon carbide particles, titanium carbide particles, silicon nitride particles, boron nitride particles, calcium carbonate particles, barium carbonate particles, magnesium carbonate particles, strontium carbonate particles, calcium sulfate particles, barium sulfate particles, molybdenum disulfide particles, barium titanate particles or the like. These non-magnetic particles may be used singly or in the form of a mixture of any two or more thereof. Among them, the use of hematite particles, iron oxide hydroxide particles, titanium oxide particles or the like is preferred, and the use of hematite particles is more preferred.

In the present invention, in order to improve the dispersibility of the non-magnetic particles in vehicle upon the production of non-magnetic coating composition, the non-magnetic particles may be surface-treated with hydroxides of aluminum, oxides of aluminum, hydroxides of silicon, oxides of silicon or the like to form a coat made of any of these compounds on the surfaces thereof. Further, the non-magnetic particles may contain Al, Ti, Zr, Mn, Sn, Sb or the like inside thereof, if required, in order to improve various properties of the obtained magnetic recording media such as light transmittance, surface electrical resistivity, mechanical strength, surface smoothness, durability or the like.

The particle shape of the hematite particles as the non-magnetic particles may include a granular shape such as a spherical shape, an irregular (anisotropic) shape, an octahedral shape, a hexahedral shape, a polyhedral shape or the like; an acicular shape such as a needle shape, a spindle shape, a rice ball shape or the like; and a plate shape, or the like.

The lower limit of the average particle size of the hematite particles as the non-magnetic particles is usually 0.075 μm, preferably 0.085 μm, more preferably 0.095 μm, and the upper limit thereof is usually 0.95 μm, preferably 0.65 μm, more preferably 0.45 μm.

(i) In the case where the shape of the hematite particles is granular-shaped, the lower limit of the average particle diameter of the granular-shaped hematite particles is usually 0.075 μm, preferably 0.085 μm, more preferably 0.095 μm, and the upper limit thereof is usually 0.95 μm, preferably 0.65 μm, more preferably 0.45 μm.

(ii) In the case where the shape of the hematite particles is acicular-shaped, the lower limit of the average particle diameter (average major axis diameter) of the acicular-shaped hematite particles is usually 0.075 μm, preferably 0.085 μm, more preferably 0.095 μm, and the upper limit thereof is usually 0.95 μm, preferably 0.65 μm, more preferably 0.45 μm; and the lower limit of the aspect ratio (average major axis diameter/average minor axis diameter) of the acicular-shaped hematite particles is usually 2:1, preferably 2.5:1, more preferably 3:1, and the upper limit thereof is usually 20:1, preferably 15:1, more preferably 10:1.

(iii) In the case where the shape of the hematite particles is plate-shaped, the lower limit of the average particle diameter (average plate surface diameter) of the plate-shaped hematite particles is usually 0.075 μm, preferably 0.085 μm, more preferably 0.095 μm, and the upper limit thereof is usually 0.95 μm, preferably 0.65 μm, more preferably 0.45 μm; and the lower limit of the plate ratio (average plate surface diameter/average thickness) of the plate-shaped hematite particles is usually 2:1, preferably 2.5:1, more preferably 3:1, and the upper limit thereof is usually 50:1, preferably 45:1, more preferably 40:1.

The magnetic recording medium having the non-magnetic undercoat layer of the present invention has a coercive force value of usually 111.4 to 143.2 kA/m (1,400 to 1,800 Oe), and when the magnetic coating film is oriented by applying a magnetic field of 397.9 kA/m (5 kOe) thereto, a squareness (Br/Bm) of usually not less than 0.88, an orientation property (OR) of usually not less than 3.5, a coercive force distribution (Switching Field Distribution: SFD) of usually not more than 0.48 and an oxidation stability (ΔBm) of usually not more than 4.0%.

The point of the present invention is that by adequately controlling the crystallite size and BET specific surface area of the magnetic metal particles containing iron as a main component, it is possible to obtain spindle-shaped magnetic metal particles containing iron as a main component, which exhibit not only an adequate coercive force and good dispersibility and oxidation stability, but also an excellent coercive force distribution, despite fine particles having a less Co content.

Conventionally, in order to obtain magnetic metal particles containing iron as a main component, which are excellent in magnetic properties and oxidation stability, it has been attempted to add various metal salts to the spindle-shaped goethite particles as a starting material. It is known that among these metals, Co forms a solid solution with iron in the obtained spindle-shaped magnetic metal particles containing iron as a main component, thereby enhancing the magnetization value and coercive force Hc thereof, and further improving the oxidation stability thereof. Therefore, it has been attempted to incorporate a large amount of cobalt into the magnetic metal particles in order to improve magnetic properties and oxidation stability thereof.

On the other hand, in the present invention, it is considered that by adequately increasing the crystallite size of the magnetic metal particles, reducing the specific surface area thereof and controlling the average major axis diameter thereof to not more than the value determined by the above-described formula, it becomes possible to obtain magnetic metal particles which exhibit an adequate coercive force and good dispersibility without deterioration of oxidation stability despite fine particles having a less Co content. Also, the less content of expensive Co added is also preferable from economical viewpoint.

In addition, in the present invention, by adding Co during the aging time but prior to the elapse of 20% of the whole aging time in the production reaction of the spindle-shaped goethite particles and by controlling the oxidation reaction such that 30 to 50% of whole Fe is oxidized, it is possible to obtain spindle-shaped goethite particles capable of exhibiting a large minor axis diameter and a relatively small aspect ratio. Further, it has been found that when a magnetic coating film is prepared using the magnetic metal particles obtained by using the spindle-shaped goethite particles as a starting material, the squareness and orientation property thereof can be remarkably enhanced.

The reason why the magnetic coating film having excellent squareness and orientation property can be produced despite using spindle-shaped goethite particles having a relatively small aspect ratio as a starting material, is considered as follows. That is, by appropriately controlling the reaction conditions upon the addition of Co, the respective crystal planes ($D_{020}$, $D_{110}$) of the ispindle-shaped goethite particles on which the surface layer has been formed, show different crystal growth properties from those of the goethite seed crystal particles thereof, and the crystallite size ratio $D_{020}/D_{110}$ is adjusted to less than 1.8. In addition to the above conditions, owing to the relatively small aspect ratio, an extremely excellent anti-sintering effect can be exhibited upon the heat-treatment and heat-reduction for the production of magnetic metal particles, so that the shape breakage of the particles can be effectively inhibited.

In the case where the ratio of the crystallite size $D_{104}$ of the spindle-shaped hematite particles to the crystallite size $D_{110}$ of the spindle-shaped goethite particles as a starting material [$D_{104}$(hematite)/$D_{110}$(goethite)] lies within the range of 1.0 to 1.3 from the standpoint of improving the anti-sintering performance, it is possible to obtain the aimed spindle-shaped magnetic metal particles containing iron as a main component. Further, the magnetic coating film produced using such magnetic metal particles containing iron as a main component can show a high squareness, a high orientation property and a narrow coercive force distribution.

The reason why the magnetic coating film exhibiting a high squareness, a high orientation property and a narrow coercive force distribution can be obtained by defining the growth ratios of the specific crystal planes of the spindle-shaped goethite particles when converted into the spindle-shaped hematite particles, is considered as follows. That is, the obtained spindle-shaped hematite particles have a specific crystallite size ratio: ($D_{110}/D_{104}$=1.8 to 2.2), and the crystallite size is adjusted such that the crystal growth of the spindle-shaped hematite particles can adequately control a reducing velocity thereof upon the heat-treatment. As a result, the sintering upon the reduction is effectively inhibited, and more than necessary growth, i.e., excessive growth beyond the size of the skeleton particle is appropriately prevented, so that the sintering and shape breakage upon the heat-treatment can be extremely reduced.

Further, in the present invention, by using the specific spindle-shaped hematite particles as a starting material, totally reducing the height of the fixed-bed to avoid the delayed heating at local portions thereof and defining the superficial velocity and temperature-rising rate of the reducing gas used upon the heat-treatment, the reduction reaction can proceed uniformly over the whole portion of the fixed-bed. As a result, it is possible to obtain magnetic metal particles containing iron as a main component exhibiting an excellent quality as a whole without unevenness due to the difference in reduction reaction rate between upper and lower portions of the fixed-bed.

The spindle-shaped magnetic metal particles containing iron as a main component according to the present invention can exhibit an adequate coercive force, excellent oxidation stability, good dispersibility and excellent coercive force distribution notwithstanding the magnetic metal particles are fine particles, especially those having an average major axis diameter as small as 0.05 to 0.15 μm. Therefore, the spindle-shaped magnetic metal particles containing iron as a main component are suitably used for the production of magnetic recording media.

Since the spindle-shaped magnetic metal particles containing iron as a main component according to the present invention are fine particles and exhibit good dispersibility and excellent coercive force distribution, the magnetic recording medium produced using the magnetic metal particles can show a high image quality and a high output characteristics and, therefore, are excellent in recording reliability.

EXAMPLES

The present invention is described in more detail by Examples and Comparative Examples, but the Examples are only illustrative and, therefore, not intended to limit the scope of the present invention thereto.

Various properties were measured by the following methods.

(1) The average major axis diameter, average minor axis diameter and aspect ratio of the respective particles are expressed by averages of values measured from an electron micrograph (x30,000). The size distribution of the particles is expressed by the value obtained by dividing the standard deviation measured simultaneously with the above values, by the average major axis diameter.

(2) The Co, Al and rare earth contents were measured using an inductively coupled high-frequency plasma atomic emission spectroscope (SPS-4000 Model, manufactured by Seiko Denshi Kogyo Co., Ltd.).

(3) The specific surface area of the respective particles is expressed by the value measured by BET method using "Monosorb MS-11" (manufactured by Cantachrom Co., Ltd.).

(4) The crystallite size of the respective particles is expressed by the thickness of the crystallite in the direction perpendicular to each crystal plane of the respective particles measured by X-ray diffraction method. The crystallite size was calculated from the X-ray diffraction peak curve prepared with respect to the respective crystal planes, according to the following Scherrer's formula:

$$\text{Crystallite size} = K\lambda/\beta \cos \theta$$

wherein $\beta$ is a true half-width of the diffraction peak which was corrected with respect to the width of machine used (unit: radian); K is a Scherrer constant (=0.9); $\lambda$ is a wavelength of X-ray used (Cu K$\alpha$-ray: 0.1542 nm); and $\theta$ is a diffraction angle (corresponding to a diffraction peak of the respective crystal planes).

(5) The ignition temperature of magnetic metal particles was measured using TG/DTA measuring device "SSC5100TG/DTA22" (manufactured by Seiko Denshi Kogyo Co., Ltd.).

(6) The magnetic properties of magnetic metal particles were measured using a vibration sample magnetometer "VSM-3S-15" (manufactured by Toei Kogyo Co., Ltd.) by applying an external magnetic field of 795.8 kA/m (10 kOe) thereto.

The respective components as shown below were charged into a 100-cc polymer bottle, and then mixed and dispersed for 8 hours using a paint shaker (manufactured by Reddevil Co., Ltd.), thereby preparing a magnetic coating composition. The thus prepared magnetic coating composition was coated on a 25 $\mu$m-thick polyethylene telephthalate film using an applicator to form coating layer having a thickness of 50 $\mu$m thereon. The obtained coating layer was then dried in a magnetic field of 397.9 kA/m (5 kOe), thereby obtaining a magnetic coating film. The thus obtained magnetic coating film was measured to determine magnetic properties thereof.

| Coating composition | |
|---|---|
| 3 mm$\phi$ steel balls | 800 parts by weight |
| Spindle-shaped magnetic metal particles containing iron as a main component | 100 parts by weight |
| polyurethane resin having a sodium sulfonate group | 20 parts by weight |
| Cyclohexanone | 83.3 parts by weight |
| Methyl ethyl ketone | 83.3 parts by weight |
| Toluene | 83.3 parts by weight |

(7) The oxidation stability ($\Delta\sigma s$) of the saturation magnetization ($\sigma s$) of particles, and the oxidation stability ($\Delta Bm$) of saturation magnetic flux density (Bm) of the magnetic coating film were measured as follows.

The particles and the magnetic coating film were placed in a constant-temperature oven maintained at 60° C. and a relative humidity of 90%, and allowed to stand therein for one week to conduct an accelerated deterioration test. Thereafter, the saturation magnetization value of the particles and the saturation magnetic flux density of the magnetic coating film were respectively measured. The oxidation stability values $\Delta\sigma s$ and $\Delta Bm$ were calculated by dividing the difference (absolute value) between the values $\sigma s$ and $\sigma s'$ measured before and after the one-week accelerated test, and the difference (absolute value) between the values Bm and Bm' measured before and after the one-week accelerated test, by the values $\sigma s$ and Bm measured before the accelerated test, respectively.

(8) The gloss of the surface of the coating film of the magnetic recording layer was measured at an angle of incidence of 45° by "glossmeter UGV-5D" (manufactured by Suga Shikenki, Co., Ltd.).

(9) The thickness of each of the non-magnetic base film, the non-magnetic undercoat layer and the magnetic recording layer constituting the magnetic recording medium was measured in the following manner by using "Digital Electronic Micrometer R351C" (manufactured by Anritsu Corp.)

The thickness (A) of a base film was first measured. Similarly, the thickness (B) (B=the sum of the thicknesses of the base-film and the non-magnetic undercoat layer) of a non-magnetic substrate obtained by forming a non-magnetic undercoat layer on the base film was measured. Furthermore, the thickness (C) (C=the sum of the thicknesses of the base film, the non-magnetic undercoat layer and the magnetic recording layer) of a magnetic recording medium obtained by forming a magnetic recording layer on the non-magnetic substrata was measured. The thickness of the non-magnetic undercoat layer is expressed by (B)–(A), and the thickness of the magnetic recording layer is expressed by (C)–(B).

EXAMPLE 1

Production of Granulated Product of Spindle-shaped Goethite Particles 30 liters of a mixed aqueous alkali solution containing sodium carbonate and aqueous sodium hydroxide solution in amounts of 25 mol and 19 mol, respectively (the concentration of sodium hydroxide is equivalent to 27.5 mol % (calculated as normality) based on mixed alkali) was charged into a bubble tower. The inside temperature of the tower was adjusted to 47° C. while passing a nitrogen gas therethrough at a superficial velocity of 2.20 cm/s. Then, 20 liters of an aqueous ferrous sulfate solution containing 20 mol of $Fe^{2+}$ (the concentration of the mixed aqueous alkali solution is 1.725 equivalents (calculated as normality) based on the ferrous sulfate) was charged into the bubble tower and the contents of the bubble tower were aged therein for 45 minutes. Thereafter, 4 liters of an aqueous cobalt sulfate solution containing 0.96 mol of $Co^{2+}$ (equivalent to 4.8 atm % (calculated as Co) based on whole Fe) was added to the bubble tower and the contents of the bubble tower were further aged for 4 hours and 15 minutes (percentage of time required for Co addition based on whole aging time: 15%). After aging, air was passed through the bubble tower at a superficial velocity of 2.50 cm/s to conduct the oxidation reaction until the oxidation percentage of $Fe^{2+}$ reached 40%, thereby producing goethite seed crystal particles.

Then, one liter of an aqueous aluminum sulfate solution containing 1.6 mol of $Al^{3+}$ (equivalent to 8.0 atm % (calculated as Al) based on whole Fe) was added at a feed rate of not more than 3 ml/s to conduct the oxidation reaction, and the reaction mixture was washed with water using a filter press until the electric conductivity reached 60 $\mu$S/cm, thereby obtaining a press cake.

A part of the obtained press cake was dried and pulverized by ordinary methods, thereby obtaining spindle-shaped goethite particles. The obtained goethite particles were of a spindle shape, and had an average major axial diameter of 0.159 μm, a standard deviation σ of 0.0306 μm, a size distribution (standard deviation/major axial diameter) of 0.192, an average minor axial diameter of 0.0248 μm, an aspect ratio of 6.4:1 and a BET specific surface area of 153.8 m²/g. The obtained goethite particles contained no dendritic particles, and had a crystallite size $D_{020}$ of 195 Å, a crystallite size $D_{110}$ of 110 Å and a crystallite size ratio $D_{020}/D_{110}$ of 1.77.

Further, it was confirmed that the obtained goethite particles had a Co content of 4.8 atm % based on whole Fe and an Al content of 8.0 atm % based on whole Fe, and Al was contained only in the surface layer portion.

Production of Granulated Product of Spindle-shaped Hematite Particles

Then, the press cake containing 1,000 g (9.22 mol as Fe) of the obtained spindle-shaped goethite particles was sufficiently dispersed in 40 liters of water. Two liters of an aqueous neodymium nitrate solution containing 121.2 g of neodymium nitrate hexahydrate (equivalent to 3.0 atm % (calculated as Nd) based on whole Fe contained in the goethite particles) was added to the dispersion, and then stirred. Further, after a 25.0 wt % sodium carbonate aqueous solution as a precipitating agent was added so as to adjust the pH of the dispersion to 9.5, the dispersion was washed with water using a filter press. The obtained press cake was extrusion-molded using a compression molding machine equipped with a mold plate having an orifice diameter of 4 mm, and the resultant product was dried at 120° C., thereby obtaining a molded product of the goethite particles coated with the neodymium compound.

The goethite particles obtained by pulverizing the molded product had a Co content of 4.8 atm % based on whole Fe; an Al content of 8.0 atm % based on whole Fe; and a Nd content of 3.0 atm % based on whole Fe. In addition, it was confirmed that Al was contained only in the goethite layer portion of each goethite particle, and Nd was contained only in the surface layer portion thereof.

The spindle-shaped goethite particles coated with the neodymium compound were heat-dehydrated in air at 760° C. to obtain spindle-shaped hematite particles having an outer layer composed of the neodymium compound, such that the ratio of the crystallite size $D_{104}$ of the obtained spindle-shaped hematite particles to the crystallite size $D_{110}$ of the spindle-shaped goethite particles [crystallite size ratio: $D_{104}$(hematite)/$D_{110}$(goethite)] was in the range of 1.0 to 1.3.

The obtained spindle-shaped hematite particles-were of a spindle shape, and had an average major axial diameter of 0.141 mm, a standard deviation s of 0.0304 μm, a size distribution (standard deviation/average major axial diameter) of 0.21.6, an average minor axial diameter of 0.0201 μm, an aspect ratio of 7.0:1 and a BET specific surface area of 38.8 m²/g. In addition, it was confirmed that the Co content of the hematite particles was 4.8 atm % based on whole Fe; the Al content thereof was 8.0 atm % based on whole Fe; and the Nd content thereof was 3.0 atm % based on whole Fe. Further, the obtained spindle-shaped hematite particles had a crystallite size $D_{104}$ of 142 Å and a crystallite size ratio: $D_{104}$(hematite)/$D_{110}$(goethite) of 1.29; and a crystallite size $D_{110}$ of 275 Å and a crystallite size ratio: $D_{110}$(hematite)/$D_{104}$(hematite) of 1.94.

Third Step: Production of Spindle-shaped Magnetic Metal Particles Containing Iron as a Main Component Then, the obtained spindle-shaped hematite particles having the outer layer composed of the neodymium compound were charged into a reducing apparatus to form a fixed-bed having a height of 7 cm. The spindle-shaped hematite particles were heated to 480° C. at a temperature-rising rate of 20° C./minute while passing a hydrogen ($H_2$) gas through the reducing apparatus at a superficial velocity of 70 cm/s at 480° C., and successively heat-reduced. Thereafter, the hydrogen gas was replaced with a nitrogen gas, the particles were cooled to 70° C., and then the oxygen partial pressure in the reducing apparatus was gradually increased by passing water vapor therethrough until the oxygen content therein reached the same content as in air, thereby forming a stable oxide film on the surface of the respective particles.

A part of the thus obtained spindle-shaped magnetic metal particles was sampled from the lower portion (corresponding to a height of not more than 2 cm) and upper portion (corresponding to a height of not less than 5 cm) of the fixed-bed, respectively, and measured separately from the remaining part of the fixed-bed to determine magnetic properties and crystallite size thereof.

As a result, it was confirmed that the obtained magnetic metal particles containing iron as a main component had an average major axis diameter of 0.126 μm, a standard deviation σ of 0.0290 μm, a size distribution (standard deviation/ average major axis diameter) of 0.230, an average minor axis diameter of 0.0198 μm, an aspect ratio of 6.4:1, a BET specific surface area of 42.5 m²/g and,a crystallite size of 160 Å, and further the magnetic metal particles had a spindle shape and a uniform particle size, and contained a less amount of dendritic particles. In addition, it was confirmed that the Co content of the magnetic metal particles was 4.8 atm % based on whole Fe; the Al content thereof was 8.0 atm % based on whole Fe; and the Nd content thereof was 3.0 atm % based on whole Fe. As to the magnetic properties of the spindle-shaped magnetic metal particles, it was confirmed that the coercive force thereof was 133.7 kA/m (1,680 Oe); the saturation magnetization σs thereof was 127.0 Am²/kg (127.0 emu/g); the squareness (σr/σs) thereof was 0.490; the oxidation stability Δσs of saturation magnetization thereof was 4.5% as an absolute value (measured value: −4.5%); and the ignition temperature thereof was 154° C.

As to the magnetic properties of the spindle-shaped magnetic metal particles sampled from the lower portion of the fixed-bed, it was confirmed that the coercive force Hc thereof was 134.3 kA/m (1,688 Oe); the saturation magnetization σs thereof was 126.3 Am²/kg (126.3 emu/g); the squareness (σr/σs) thereof was 0.491; and the X-ray-measured crystallite size $D_{110}$ thereof was 158 Å. As to the magnetic properties of the spindle-shaped magnetic metal particles sampled from the upper portion of the fixed-bed, it was confirmed that the coercive force Hc thereof was 133.1 kA/m (1,673 Oe); the saturation magnetization σs thereof was 127.5 Am²/kg (127.5 emu/g); the squareness (σr/σs) thereof was 0.489; and the X-ray-measured crystallite size $D_{110}$ thereof was 161 Å.

Further, as to sheet magnetic characteristics, it was confirmed that the sheet coercive force Hc was 132.1 kA/m (1,660 Oe); the sheet squareness (Br/Bm) was 0.850; the sheet orientation property (OR) was 3.10; the sheet SFD was 0.510; and ΔBm was 3.0% (measured value: −3.0%).

EXAMPLES 2 TO 4 AND COMPARATIVE EXAMPLES 1 TO 5

Goethite Particles 1 to 6

First Step: Production of Goethite Particles

The same procedure as defined in Example 1 was conducted except that production conditions of goethite particles, i.e., production reaction conditions of goethite seed crystal particles and growth reaction conditions, were varied as shown in Table 1, thereby obtaining spindle-shaped goethite particles. Various properties of the obtained goethite particles are shown in Table 2. Meanwhile, in Table 1, the alkali ratio was calculated from the following formula:

Alkali ratio=(1/2 alkali hydroxide)/(whole alkali)

wherein the whole alkali is a sum of 1/2 alkali hydroxide and alkali carbonate.

In addition, the equivalent ratio was calculated from the following formula:

Equivalent ratio=(whole alkali)/($Fe^{2+}$)

wherein the whole alkali is a sum of 1/2 alkali hydroxide and alkali carbonate.

Hematite Particles 1 to 6

Second Step: Production of Hematite Particles

The same procedure as defined in Example 1 was conducted except that the goethite particles 1 to 6 obtained in the above first step were used, and kind and amount of the coating material used for the anti-sintering treatment, the heat-dehydrating temperature and the subsequent heat-treatment temperature were varied, thereby producing hematite particles. Production conditions are shown in Table 3, and various properties of the obtained hematite particles are shown in Table 4.

Third Step: Production of Spindle-shaped Magnetic Metal Particles

The same procedure as defined in Example 1 was conducted except that the hematite particles 1 to 6 obtained in the above second step were used, and height of fixed-bed, kind of gas used upon heating, superficial velocity of reducing gas, temperature-rising rate and heat-reducing temperature was changed variously, thereby producing magnetic metal particles. Production conditions and various properties of the obtained spindle-shaped magnetic metal particles are shown in Tables 5 and 6; various properties of the magnetic metal particles sampled from the upper and lower portions of the fixed-bed are shown in Table 7; and various properties of the sheet produced using the obtained magnetic metal particles are shown in Table 8.

EXAMPLE 5

Production of Magnetic Recording Medium 100 parts by weight of the spindle-shaped magnetic metal particles obtained in Example 1, 10.0 parts by weight of a vinyl chloride-vinyl acetate copolymer resin (tradename: MR-110, produced by Nippon Zeon Co., Ltd.), 23.3 parts by weight of cyclohexanone, 10.0 parts by weight of methyl ethyl ketone, 1.0 part by weight of carbon black particles (produced by Mitsubishi Chemical Corp., average particle size: 26 nm; BET specific surface area: 130 m²/g) and 7.0 parts by weight of alumina particles "AKP-30" (tradename, produced by Sumitomo Kagaku Co., Ltd., average particle size: 0.4 μm) were kneaded together for 20 minutes using a kneader. The obtained kneaded material was diluted by adding 79.6 parts by weight of toluene, 110.2 parts by weight of methyl ethyl ketone and 17.8 parts by weight of cyclohexanone thereto, and then the resultant mixture was mixed and dispersed for 3 hours by a sand grinder, thereby obtaining a dispersion.

The obtained dispersion was mixed with 33.3 parts by weight of a solution prepared by dissolving 10.0 parts by weight (solid content) of a polyurethane resin (tradename: E-900, produced by Takeda Yakuhin Kogyo Co., Ltd.) in a mixed solvent containing methyl ethyl ketone and toluene at a mixing ratio of 1:1, and the resultant mixture was mixed and dispersed for 30 minutes by a sand grinder. Thereafter, the obtained dispersion was passed through a filter having a mesh size of 1 μm. The obtained filter cake was mixed under stirring with 12.1 parts by weight of a solution prepared by dissolving 1.0 part by weight of myristic acid and 3.0 parts by weight of butyl stearate in a mixed solvent containing methyl ethyl ketone, toluene and cyclohexanone at a mixing ratio (weight) of 5:3:2, and with 15.2 parts by weight of a solution prepared by dissolving 5.0 parts by weight of trifunctional low molecular weight polyisocyanate (tradename: E-31, produced by Takeda Yakuhin Kogyo Co., Ltd.) in a mixed solvent containing methyl ethyl ketone, toluene and cyclohexanone at a mixing ratio (weight) of 5:3:2, thereby producing a magnetic coating composition.

The obtained magnetic coating composition contained the following components:

| | |
|---|---|
| Spindle-shaped magnetic metal particles | 100 weight parts |
| Vinyl chloride-vinyl acetate copolymer resin | 10 weight parts |
| Polyurethane resin | 10 weight parts |
| Alumina particles | 7.0 weight parts |
| Carbon black fine particles | 1.0 weight part |
| Myristic acid | 1.0 weight part |
| Butyl stearate | 3.0 weight parts |
| Trifunctional low molecular weight polyisocyanate | 5.0 weight parts |
| Cyclohexanone | 56.6 weight parts |
| Methyl ethyl ketone | 141.5 weight parts |
| Toluene | 85.4 weight parts |

The obtained magnetic coating composition had a viscosity of 5,650 cP.

The thus obtained magnetic coating composition was passed through a filter having a mesh size of 1 μm. Thereafter, the magnetic coating composition was coated on a 12 μm-thick polyester base film using a slit coater having a gap width of 45 μm and then dried, thereby forming a magnetic layer on the base film. The surface of the obtained magnetic recording layer was calendered and smoothened by an ordinary method, and then the film was cut into a width of ½ inch (1.27 cm). The obtained tape was allowed to stand in a curing oven maintained at 60° C., for 24 hours to sufficiently cure the magnetic recording layer therein, thereby producing a magnetic tape. The obtained coating layer had a thickness of 3.5 μm.

With respect to magnetic properties of the obtained magnetic tape, the coercive force value thereof was 140.7 kA/m (1768 Oe); the gloss thereof was 229%; the squareness (Br/Bm) thereof was 0.887; the sheet orientation property (OR) was 3.66; the sheet SFD was 0.439; and ΔBm was 3.70% as an absolute value (measured value: −3.70%).

EXAMPLE 6

Production of Non-magnetic Undercoat Layer 12 g of non-magnetic particles (kind: hematite particles; particle shape: spindle-shaped; average major axial diameter: 0.187 μ; average minor axial diameter: 0.0240 μ; aspect ratio: 7.8:1; geometrical standard deviation value: 1.33; BET specific surface area value: 43.3 m²/g; volume resistivity value: 8.6×10⁸ Ω·cm; blackness (L* value): 32.6) were mixed with a binder resin solution (containing 30% by weight of vinyl chloride-vinyl acetate copolymer resin having a sodium sulfonate group and 70% by weight of cyclohexanone) and cyclohexanone, thereby obtaining a mixture (solid content: 72%). The obtained mixture was further kneaded for 30 minutes using a plastomill, thereby obtaining a kneaded material.

The thus obtained kneaded material was added to a 140 ml glass bottle together with 95 g of 1.5 mm φ glass beads, an additional amount of a binder resin solution (containing 30% by weight of polyurethane resin having a sodium sulfonate group and 70% by weight of a mixed solvent of methyl ethyl ketone and toluene (1:1)), cyclohexanone, methyl ethyl ketone and toluene. The resultant mixture was mixed and dispersed for 6 hours by a paint shaker, thereby obtaining a coating composition. Thereafter, a lubricant was added to the obtained coating composition, and the mixture was mixed and dispersed for 15 minutes by a paint shaker.

The composition of the obtained non-magnetic coating composition was as follows:

| | |
|---|---|
| Non-magnetic particles 1 | 100 parts by weight |
| Vinyl chloride-vinyl acetate copolymer resin having a sodium sulfonate group | 10 parts by weight |
| Polyurethane resin having a sodium sulfonate group | 10 parts by weight |
| Lubricant (myristic acid: butyl stearate = 1:1) | 2 parts by weight |
| Cyclohexanone | 56.9 parts by weight |
| Methyl ethyl ketone | 142.3 parts by weight |
| Toluene | 85.4 parts by weight |

The obtained non-magnetic coating composition had a viscosity of 310 cp.

Next, the non-magnetic coating composition was coated on a 12 μm-thick polyethylene terephthalate film using an applicator so as to form thereon a 55 μm-thick coating layer, and then dried, thereby producing a non-magnetic undercoat layer.

The thus obtained non-magnetic undercoat layer had a thickness of 3.4 μm, and exhibited a gloss of 193%, a surface roughness Ra of 8.2 nm, a Young's modulus (relative value) of 123, a linear absorption of 1.01 $\mu^{-1}$ and a surface electrical resistivity value of 1.1×10⁻Ω·cm.

Production of Magnetic Recording Medium 100 parts by weight of the spindle-shaped magnetic metal particles obtained in Example 1, 10.0 parts by weight of a vinyl chloride-vinyl acetate copolymer resin (tradename: MR-110, produced by Nippon Zeon Co., Ltd.), 23.3 parts by weight of cyclohexanone, 10.0 parts by weight of methyl ethyl ketone, 1.0 part by weight of carbon black particles (produced by Mitsubishi Chemical Corp., average particle size: 26 nm; BET specific surface area: 130 m²/g) and 7.0 parts by weight of alumina particles "AKP-30" (tradename, produced by Sumitomo Kagaku Co., Ltd., average particle size: 0.4 μm) were kneaded together for 20 minutes using a kneader. The obtained kneaded material was diluted by adding 79.6 parts by weight of toluene, 110.2 parts by weight of methyl ethyl ketone and 17.8 parts by weight of cyclohexanone thereto, and then the resultant mixture was mixed and dispersed for 3 hours by a sand grinder, thereby obtaining a dispersion.

The obtained dispersion was mixed with 33.3 parts by weight of a solution prepared by dissolving 10.0 parts by weight (solid content) of a polyurethane resin (tradename: E-900, produced by Takeda Yakuhin Kogyo Co., Ltd.) in a mixed solvent containing methyl ethyl ketone and toluene at a mixing ratio of 1:1, and the resultant mixture was mixed and dispersed for 30 minutes by a sand grinder. Thereafter, the obtained dispersion was passed through a filter having a mesh size of 1 μm. The obtained filter cake was mixed under stirring with 12.1 parts by weight of a solution prepared by dissolving 1.0 part by weight of myristic acid and 3.0 parts by weight of butyl stearate in a mixed solvent containing methyl ethyl ketone, toluene and cyclohexanone at a mixing ratio (weight) of 5:3:2, and with 15.2 parts by weight of a solution prepared by dissolving 5.0 parts by weight of trifunctional low molecular weight polyisocyanate (tradename: E-31, produced by Takeda Yakuhin Kogyo Co., Ltd.) in a mixed solvent containing methyl ethyl ketone, toluene and cyclohexanone at a mixing ratio (weight) of 5:3:2, thereby producing a magnetic coating composition.

The obtained magnetic coating composition contained the following components:

| | |
|---|---|
| Spindle-shaped magnetic metal particles | 100 weight parts |
| Vinyl chloride-vinyl acetate copolymer resin | 10 weight parts |
| Polyurethane resin | 10 weight parts |
| Alumina particles | 7.0 weight parts |
| Carbon black fine particles | 1.0 weight part |
| Myristic acid | 1.0 weight part |
| Butyl stearate | 3.0 weight parts |
| Trifunctional low molecular weight polyisocyanate | 5.0 weight parts |
| Cyclohexanone | 56.6 weight parts |
| Methyl ethyl ketone | 141.5 weight parts |
| Toluene | 85.4 weight parts |

The obtained magnetic coating composition had a viscosity of 5,650 cP.

The thus obtained magnetic coating composition was passed through a filter having a mesh size of 1 μm. Thereafter, the magnetic coating composition was coated on the obtained non-magnetic undercoat layer using a slit coater having a gap width of 45 μm and then dried, thereby forming a magnetic layer on the base film. The surface of the obtained magnetic recording layer was calendered and smoothened by an ordinary method, and then the film was cut into a width of ½ inch (1.27 cm). The obtained tape was allowed to stand in a curing oven maintained at 60° C., for 24 hours to sufficiently cure the magnetic recording layer therein, thereby producing a magnetic tape. The obtained coating layer had a thickness of 3.5 μm.

With respect to magnetic properties of the obtained magnetic tape, the coercive force value thereof was 139.7 kA/m (1755 Oe); the gloss thereof was 241%; the squareness (Br/Bm) thereof was 0.889; the sheet orientation property (OR) was 3.72; the sheet SFD was 0.432; and ΔBm was 3.9% as an absolute value (measured value: −3.9%).

TABLE 1

Production of goethite particles
Production reaction of goethite seed crystal particles
Mixed aqueous alkali solution

| Goethite particles | Aqueous alkali carbonate solution Kind | Amount used (mol) | Aqueous alkali hydroxide solution Kind | Amount used (mol) | Alkali ratio[1] (mol %) |
|---|---|---|---|---|---|
| Goethite particles 1 | $Na_2CO_3$ | 25 | NaOH | 19 | 27.5 |
| Goethite particles 2 | $Na_2CO_3$ | 25 | NaOH | 19 | 27.5 |
| Goethite particles 3 | $Na_2CO_3$ | 25 | NaOH | 19 | 27.5 |
| Goethite particles 4 | $Na_2CO_3$ | 25 | NaOH | 19 | 27.5 |
| Goethite particles 5 | $Na_2CO_3$ | 25 | NaOH | 19 | 27.5 |
| Goethite particles 6 | Method described in Comparative Example 1 of Japanese Patent Application Laid-Open (KOKAI) No. 8-236327 (1996) | | | | |

Note [1] Alkali ratio (½·alkali hydroxide)/(whole alkali) wherein whole alkali is a sum of ½·alkali hydroxide and alkali carbonate Production of goethite particles
Production reaction of goethite seed crystal particles

| Goethite particles | Aqueous ferrous salt solution Kind | Amount used (mol) | Equivalent ratio[2] |
|---|---|---|---|
| Goethite particles 1 | $FeSO_4$ | 20 | 1.725 |
| Goethite particles 2 | $FeSO_4$ | 20 | 1.725 |
| Goethite particles 3 | $FeSO_4$ | 20 | 1.725 |
| Goethite particles 4 | $FeSO_4$ | 20 | 1.725 |
| Goethite particles 5 | $FeSO_4$ | 20 | 1.725 |
| Goethite particles 6 | Method described in Comparative Example 1 of Japanese Patent Application Laid-Open (KOKAI) No. 8-236327 (1996) | | |

Note [2] Equivalent ratio = (whole alkali)/($Fe^{2+}$) wherein whole alkali is a sum of ½·alkali hydroxide and alkali carbonate Production of goethite particles
Production reaction of goethite seed crystal particles
Aging

| Goethite particles | Temperature (° C.) | Time (hr) | Superficial velocity of nitrogen passed (cm/s) |
|---|---|---|---|
| Goethite particles 1 | 48 | 5 | 2.30 |
| Goethite particles 2 | 50 | 5 | 2.20 |
| Goethite particles 3 | 44 | 5 | 2.10 |
| Goethite particles 4 | 46 | 5 | 2.70 |
| Goethite particles 5 | 49 | 5 | 2.00 |
| Goethite particles 6 | Method described in Comparative Example 1 of Japanese Patent Application Laid-Open (KOKAI) No. 8-236327 (1996) | | |

TABLE 1-continued

Production of goethite particles
Production reaction of goethite seed crystal particles
Cobalt compound

| Goethite particles | Kind | Amount added (Co/Fe) (atom %) | Addition time after initiation of aging (hr) | (Co addition time)/(whole aging time) (%) |
|---|---|---|---|---|
| Goethite particles 1 | $CoSO_4$ | 4.5 | 1.00 | 20 |
| Goethite particles 2 | $CoSO_4$ | 3.8 | 0.50 | 10 |
| Goethite particles 3 | $CoSO_4$ | 4.8 | 1.00 | 20 |
| Goethite particles 4 | $CoSO_4$ | 4.8 | 2.00 | 40 |
| Goethite particles 5 | $CoSO_4$ | 4.0 | 1.50 | 30 |
| Goethite particles 6 | Method described in Comparative Example 1 of Japanese Patent Application Laid-Open (KOKAI) No. 8-236327 (1996) | | | |

Production of goethite particles
Production reaction of goethite seed crystal particles

| Goethite particles | Superficial velocity of air passed (cm/s) | Temperature (° C.) |
|---|---|---|
| Goethite particles 1 | 3.00 | 48 |
| Goethite particles 2 | 2.30 | 50 |
| Goethite particles 3 | 3.30 | 44 |
| Goethite particles 4 | 3.60 | 46 |
| Goethite particles 5 | 1.50 | 49 |
| Goethite particles 6 | Method described in comparative Example 1 of Japanese Patent Application Laid-Open (KOKAI) No.8-236327 (1996) | |

Production reaction of goethite particles
Growth reaction of seed crystal particles
Aluminum compound

| Goethite particles | Kind | Amount added (Al/Fe) (atom %) | Addition time (oxidation percentage of $Fe^{2+}$) (%) | Superficial velocity of air passed (cm/s) |
|---|---|---|---|---|
| Goethite particles 1 | Aluminum sulfate | 8.0 | 40 | 3.00 |
| Goethite particles 2 | Aluminum sulfate | 7.0 | 40 | 2.30 |
| Goethite particles 3 | Aluminum sulfate | 7.5 | 40 | 3.30 |
| Goethite particles 4 | Aluminum sulfate | 4.0 | 45 | 3.60 |
| Goethite particles 5 | Aluminum sulfate | 6.0 | 55 | 1.50 |
| Goethite particles 6 | Method described in Comparative Example 1 of Japanese Patent Application Laid-Open (KOKAI) No. 8-236327 (1996) | | | |

TABLE 2

| Goethite particles | Properties of goethite particles | | |
|---|---|---|---|
| | Shape | Average major axis diameter (L) (μm) | Standard deviation (σ) (μm) |
| Goethite particles 1 | Spindle-shaped | 0.144 | 0.0244 |
| Goethite particles 2 | Spindle-shaped | 0.169 | 0.0332 |
| Goethite particles 3 | Spindle-shaped | 0.109 | 0.0165 |
| Goethite particles 4 | Spindle-shaped | 0.092 | 0.0198 |
| Goethite particles 5 | Spindle-shaped | 0.175 | 0.0462 |
| Goethite particles 6 | Acicular | 0.155 | 0.0446 |

| Goethite particles | Properties of goethite particles | | | |
|---|---|---|---|---|
| | Size distribution (σ/L) | Average minor axis diameter (μm) | Aspect ratio | BET specific surface area (m²/g) |
| Goethite particles 1 | 0.169 | 0.0236 | 6.1:1 | 149.8 |
| Goethite particles 2 | 0.196 | 0.0228 | 7.4:1 | 133.1 |
| Goethite particles 3 | 0.151 | 0.0198 | 5.5:1 | 158.7 |
| Goethite particles 4 | 0.215 | 0.0112 | 8.2:1 | 174.8 |
| Goethite particles 5 | 0.264 | 0.0199 | 8.8:1 | 164.3 |
| Goethite particles 6 | 0.288 | 0.0130 | 11.9:1 | 97.6 |

| Goethite particles | Properties of goethite particles Composition of whole particles | |
|---|---|---|
| | Co content (Co/Fe) (atom %) | Al content (Al/Fe) (atom %) |
| Goethite particles 1 | 4.5 | 8.0 |
| Goethite particles 2 | 3.8 | 7.0 |
| Goethite particles 3 | 4.8 | 7.5 |
| Goethite particles 4 | 4.8 | 4.0 |
| Goethite particles 5 | 4.0 | 6.0 |
| Goethite particles 6 | 5.0 | 5.0 |

| Goethite particles | Properties of goethite particles | | |
|---|---|---|---|
| | Crystallite size $D_{020}$ (Å) | Crystallite size $D_{110}$ (Å) | Crystallite size ratio $D_{020}/D_{110}$ |
| Goethite particles 1 | 179 | 104 | 1.72 |
| Goethite particles 2 | 199 | 120 | 1.66 |
| Goethite particles 3 | 177 | 101 | 1.75 |
| Goethite particles 4 | 165 | 87 | 1.90 |
| Goethite particles 5 | 195 | 105 | 1.86 |
| Goethite particles 6 | 181 | 91 | 1.99 |

TABLE 3

| Hematite particles | Goethite particles used | Production conditions of hematite particles Anti-sintering treatment | |
|---|---|---|---|
| | | Kind of rare earth compound contained in anti-sintering agent | Amount added (Re/Fe) (atom %) |
| Hematite particles 1 | Goethite particles 1 | Neodymium nitrate | 3.5 |
| Hematite particles 2 | Goethite particles 2 | Yttrium nitrate | 2.5 |
| Hematite particles 3 | Goethite particles 3 | Yttrium nitrate | 4.8 |
| Hematite particles 4 | Goethite particles 4 | Neodymium nitrate | 4.5 |
| Hematite particles 5 | Goethite particles 5 | Neodymium nitrate | 3.0 |
| Hematite particles 6 | Goethite particles 6 | Method described in Comparative Example 1 of Japanese Patent Application Laid-Open (KOKAI) No. 8-236327 (1996) | |

| Hematite particles | Production conditions of hematite particles Heat-treatment | |
|---|---|---|
| | Heating temperature (° C.) | Atmosphere |
| Hematite particles 1 | 770 | Air |
| Hematite particles 2 | 750 | Air |
| Hematite particles 3 | 680 | Air |
| Hematite particles 4 | 660 | Air |
| Hematite particles 5 | 750 | Air |
| Hematite particles 6 | Method described in Comparative Example 1 of Japanese Patent Application Laid-Open (KOKAI) No. 8-236327 (1996) | |

TABLE 4

| Hematite particles | Properties of hematite particles | | |
|---|---|---|---|
| | Shape | Average major axis diameter (L) (μm) | Standard deviation (σ) (μm) |
| Hematite particles 1 | Spindle-shaped | 0.125 | 0.0248 |
| Hematite particles 2 | Spindle-shaped | 0.147 | 0.0307 |
| Hematite particles 3 | Spindle-shaped | 0.095 | 0.0171 |
| Hematite particles 4 | Spindle-shaped | 0.082 | 0.0194 |
| Hematite particles 5 | Spindle-shaped | 0.152 | 0.0418 |

TABLE 4-continued

| Hematite particles 6 | Acicular | 0.135 | 0.0406 |
|---|---|---|---|

| | Properties of hematite particles | | | |
|---|---|---|---|---|
| Hematite particles | size distribution (σ/L) | Average minor axis diameter (μm) | Aspect ratio | BET specific surface area (m²/g) |
| Hematite particles 1 | 0.198 | 0.0187 | 6.7:1 | 39.7 |
| Hematite particles 2 | 0.209 | 0.0188 | 7.8:1 | 37.6 |
| Hematite particles 3 | 0.180 | 0.0146 | 6.5:1 | 45.6 |
| Hematite particles 4 | 0.237 | 0.0099 | 8.3:1 | 56.7 |
| Hematite particles 5 | 0.275 | 0.0165 | 9.2:1 | 41.3 |
| Hematite particles 6 | 0.301 | 0.0108 | 12.5:1 | 62.7 |

| | Properties of hematite particles Composition of whole particles | | |
|---|---|---|---|
| Hematite particles | Co content (Co/Fe) (atom %) | Al content (Al/Fe) (atom %) | Rare earth content (Re/Fe) (atom %) |
| Hematite particles 1 | 4.5 | 8.0 | 3.5 |
| Hematite particles 2 | 3.8 | 7.0 | 2.5 |
| Hematite particles 3 | 4.8 | 7.5 | 4.8 |
| Hematite particles 4 | 4.8 | 4.0 | 4.5 |
| Hematite particles 5 | 4.0 | 6.0 | 3.0 |
| Hematite particles 6 | 5.0 | 5.0 | 2.0 |

| | Properties of hematite particles Crystallite size | |
|---|---|---|
| Hematite particles | $D_{104}$ (Å) | $D_{110}$ (Å) |
| Hematite particles 1 | 133 | 251 |
| Hematite particles 2 | 138 | 276 |
| Hematite particles 3 | 125 | 233 |
| Hematite particles 4 | 116 | 196 |
| Hematite particles 5 | 121 | 215 |
| Hematite particles 6 | 119 | 191 |

| | Properties of hematite particles | | |
|---|---|---|---|
| Hematite particles | Crystallite size ratio ($D_{110}/D_{104}$) | Goethite crystallite size ($D_{110}$ (g)) (Å) | Crystallite size ratio of hematite to goethite ($D_{104}/D_{110}$ (g)) |
| Hematite particles 1 | 1.89 | 104 | 1.28 |
| Hematite particles 2 | 2.00 | 120 | 1.15 |
| Hematite particles 3 | 1.86 | 101 | 1.24 |
| Hematite particles 4 | 1.69 | 87 | 1.33 |
| Hematite particles 5 | 1.78 | 105 | 1.15 |
| Hematite particles 6 | 1.61 | 91 | 1.31 |

TABLE 5

| Examples and Comparative Examples | Kind of hematite particles used |
|---|---|
| Example 2 | Hematite particles 1 |
| Example 3 | Hematite particles 2 |
| Example 4 | Hematite particles 3 |
| Comparative Example 1 | Hematite particles 4 |
| Comparative Example 2 | Hematite particles 5 |
| Comparative Example 3 | Hematite particles 2 |
| Comparative Example 4 | Hematite particles 6 |
| Comparative Example 5 | Hematite particles 6 |

| Examples and Comparative Examples | Conditions of reduction | | |
|---|---|---|---|
| | Height of fixed bed (cm) | Kind of heating gas | Kind of reducing gas |
| Example 2 | 8 | $H_2$ | $H_2$ |
| Example 3 | 10 | $H_2$ | $H_2$ |
| Example 4 | 5 | $H_2$ | $H_2$ |
| Comparative Example 1 | 10 | $H_2$ | $H_2$ |
| Comparative Example 2 | 18 | $H_2$ | $H_2$ |
| Comparative Example 3 | 22 | $H_2$ | $H_2$ |
| Comparative Example 4 | Method described in Comparative Example 1 of Japanese Patent Application Laid-Open (KOKAI) No. 8-236327 (1996) | | |
| Comparative Example 5 | Method described in Example 1 of Japanese Patent Application Laid-Open (KOKAI) No. 8-236327 (1996) | | |

| Examples and Comparative Examples | Conditions of reduction | | |
|---|---|---|---|
| | Superficial velocity (cm/s) | Temperature rise rate (° C./min.) | Reducing temperature (° C.) |
| Example 2 | 80 | 30 | 460 |
| Example 3 | 100 | 40 | 470 |
| Example 4 | 120 | 25 | 440 |
| Comparative Example 1 | 100 | 40 | 440 |
| Comparative Example 2 | 120 | 90 | 460 |
| Comparative Example 3 | 35 | 40 | 460 |
| Comparative Example 4 | Method described in Comparative Example 1 of Japanese Patent Application Laid-Open (KOKAI) No. 8-236327 (1996) | | |
| Comparative Example 5 | Method described in Example 1 of Japanese Patent Application Laid-Open (KOKAI) No. 8-236327 (1996) | | |

TABLE 6

| Examples and Comparative Examples | Properties of magnetic metal particles containing iron as a main component | | |
|---|---|---|---|
| | Average major axis diameter (L) (μm) | Standard deviation (σ) (μm) | size distribution (σ/L) |
| Example 2 | 0.111 | 0.0239 | 0.215 |
| Example 3 | 0.131 | 0.0292 | 0.223 |
| Example 4 | 0.085 | 0.0171 | 0.201 |
| Comparative Example 1 | 0.073 | 0.0222 | 0.304 |
| Comparative Example 2 | 0.135 | 0.0409 | 0.303 |
| Comparative Example 3 | 0.127 | 0.0400 | 0.315 |
| Comparative Example 4 | 0.122 | 0.0382 | 0.313 |
| Comparative Example 5 | 0.123 | 0.0389 | 0.316 |

| Examples and Comparative Examples | Properties of magnetic metal particles containing iron as a main component | | |
|---|---|---|---|
| | Average minor axis diameter (μm) | Aspect ratio | BET specific surface area (S) (m²/g) |
| Example 2 | 0.0179 | 6.2:1 | 44.1 |
| Example 3 | 0.0182 | 7.2:1 | 41.3 |
| Example 4 | 0.0135 | 6.3:1 | 48.7 |
| Comparative Example 1 | 0.0089 | 8.2:1 | 54.7 |
| Comparative Example 2 | 0.0159 | 8.5:1 | 45.9 |
| Comparative Example 3 | 0.0190 | 6.7:1 | 38.1 |
| Comparative Example 4 | 0.0128 | 9.4:1 | 40.2 |
| Comparative Example 5 | 0.0133 | 9.2:1 | 46.2 |

| Examples and Comparative Examples | Properties of magnetic metal particles containing iron as main component | |
|---|---|---|
| | General formula: $-160 \times L + 65$ | Crystallite size $D_{110}$ (Å) |
| Example 2 | 47.24 | 157 |
| Example 3 | 44.04 | 159 |
| Example 4 | 51.40 | 152 |
| Comparative Example 1 | 53.32 | 138 |
| Comparative Example 2 | 43.40 | 147 |
| Comparative Example 3 | 44.68 | 163 |
| Comparative Example 4 | 45.80 | 131 |
| Comparative Example 5 | 45.48 | 131 |

| Examples and Comparative Examples | Properties of magnetic metal particles containing iron as main component | | |
|---|---|---|---|
| | Co content (Co/Fe) (atom %) | Al content (Al/Fe) (atom %) | Rare earth content (Re/Fe) (atom %) |
| Example 2 | 4.5 | 8.0 | 3.5 |
| Example 3 | 3.8 | 7.0 | 2.5 |
| Example 4 | 4.8 | 7.5 | 4.8 |
| Comparative Example 1 | 4.8 | 4.0 | 4.5 |
| Comparative Example 2 | 4.0 | 6.0 | 3.0 |
| Comparative Example 3 | 3.8 | 7.0 | 2.5 |
| Comparative Example 4 | 5.0 | 5.0 | 2.0 |
| Comparative Example 5 | 5.0 | 6.5 | 2.0 |

TABLE 7

| Examples and Comparative Examples | Properties of magnetic metal particles containing iron as main component Magnetic properties of lower portion of fixed bed (portion of not more than 2 cm from bottom) | | | |
|---|---|---|---|---|
| | Coercive force | | Saturation magnetization | |
| | (kA/m) | (Oe) | (Am²/kg) | (emu/g) |
| Example 2 | 138.8 | 1,744 | 123.9 | 123.9 |
| Example 3 | 129.0 | 1,621 | 124.3 | 124.3 |
| Example 4 | 142.5 | 1,791 | 131.5 | 131.5 |
| Comparative Example 1 | 144.8 | 1,819 | 127.4 | 126.8 |
| Comparative Example 2 | 127.9 | 1,607 | 124.3 | 125.3 |
| Comparative Example 3 | 127.2 | 1,599 | 125.0 | 125.0 |

| Examples and Comparative Examples | Properties of magnetic metal particles containing iron as main component Magnetic properties of lower portion of fixed bed (portion of not more than 2 cm from bottom) | |
|---|---|---|
| | Squareness (σr/σs) (–) | Crystallite size $D_{110}$ (Å) |
| Example 2 | 0.492 | 155 |
| Example 3 | 0.490 | 157 |
| Example 4 | 0.492 | 151 |
| Comparative Example 1 | 0.493 | 132 |
| Comparative Example 2 | 0.489 | 143 |
| Comparative Example 3 | 0.489 | 158 |

| Examples and Comparative Examples | Properties of magnetic metal particles containing iron as main component Magnetic properties of upper portion of fixed bed (portion of not more than 2 cm from top) | | | |
|---|---|---|---|---|
| | Coercive force | | Saturation magnetization | |
| | (kA/m) | (Oe) | (Am²/kg) | (emu/g) |
| Example 2 | 137.6 | 1,729 | 125.0 | 125.0 |
| Example 3 | 127.9 | 1,607 | 125.7 | 125.7 |
| Example 4 | 142.0 | 1,784 | 133.1 | 133.1 |
| Comparative Example 1 | 140.8 | 1,769 | 130.9 | 130.6 |
| Comparative Example 2 | 124.5 | 1,565 | 129.1 | 127.0 |
| Comparative Example 3 | 121.8 | 1,531 | 130.9 | 130.9 |

TABLE 7-continued

Properties of magnetic metal particles containing iron as main component
Magnetic properties of upper portion of fixed bed (portion of not more than 2 cm from top)

| Examples and Comparative Examples | Squareness (-) | Crystallite size $D_{110}$ (Å) |
|---|---|---|
| Example 2 | 0.490 | 158 |
| Example 3 | 0.489 | 161 |
| Example 4 | 0.491 | 153 |
| Comparative Example 1 | 0.489 | 141 |
| Comparative Example 2 | 0.486 | 152 |
| Comparative Example 3 | 0.484 | 166 |

Properties of magnetic metal particles containing iron as main component
Difference in magnetic properties between lower and upper portions of fixed bed (Δ)

| Examples and Comparative Examples | Coercive force (kA/m) | (Oe) | Saturation magnetization (Am²/kg) | (emu/g) |
|---|---|---|---|---|
| Example 2 | 1.2 | 15 | 1.1 | 1.1 |
| Example 3 | 1.1 | 14 | 1.4 | 1.4 |
| Example 4 | 0.6 | 7 | 1.6 | 1.6 |
| Comparative Example 1 | 4.0 | 50 | 4.1 | 4.1 |
| Comparative Example 2 | 3.3 | 42 | 4.8 | 4.8 |
| Comparative Example 3 | 5.4 | 68 | 5.9 | 5.9 |

Properties of magnetic metal particles containing iron as main component
Difference in magnetic properties between lower and upper portion of fixed bed (Δ)

| Examples and Comparative Examples | Squareness (-) | Crystallite size $D_{110}$ (Å) |
|---|---|---|
| Example 2 | 0.002 | 3 |
| Example 3 | 0.001 | 4 |
| Example 4 | 0.001 | 2 |
| Comparative Example 1 | 0.004 | 9 |
| Comparative Example 2 | 0.003 | 9 |
| Comparative Example 3 | 0.005 | 8 |

TABLE 8

Properties of magnetic metal particles containing iron as main component

| Examples and Comparative Examples | Coercive force (Hc) (kA/m) | (Oe) | Saturation magnetization (σs) (Am²/kg) | (emu/g) |
|---|---|---|---|---|
| Example 2 | 137.8 | 1,732 | 124.8 | 124.8 |
| Example 3 | 128.1 | 1,610 | 125.2 | 125.2 |
| Example 4 | 142.2 | 1,787 | 132.6 | 132.6 |
| Comparative Example 1 | 142.9 | 1,796 | 129.1 | 129.1 |
| Comparative Example 2 | 126.4 | 1,588 | 126.3 | 126.3 |
| Comparative Example 3 | 124.1 | 1,560 | 128.8 | 128.8 |
| Comparative Example 4 | 139.3 | 1,750 | 127.8 | 127.8 |
| Comparative Example 5 | 132.1 | 1,660 | 132.9 | 132.9 |

Properties of magnetic metal particles containing iron as main component

| Examples and Comparative Examples | Squareness (σr/σs) (-) | Oxidation stability (Δσs) (%) | Ignition temperature (° C.) |
|---|---|---|---|
| Example 2 | 0.491 | 4.2 | 147 |
| Example 3 | 0.489 | 4.4 | 144 |
| Example 4 | 0.491 | 4.9 | 141 |
| Comparative Example 1 | 0.491 | 8.7 | 129 |
| Comparative Example 2 | 0.488 | 5.7 | 134 |
| Comparative Example 3 | 0.487 | 5.1 | 138 |
| comparative Example 4 | 0.490 | 9.5 | 124 |
| Comparative Example 5 | 0.491 | 5.6 | 133 |

Properties of magnetic coating film (when oriented in a magnetic field of 5 kOe)

| Examples and Comparative Examples | Coercive force (Hc) (kA/m) | (Oe) | Squareness (Br/Bm) |
|---|---|---|---|
| Example 2 | 136.5 | 1,715 | 0.847 |
| Example 3 | 126.4 | 1,589 | 0.851 |
| Example 4 | 142.1 | 1,786 | 0.853 |
| Comparative Example 1 | 141.3 | 1,775 | 0.839 |
| Comparative Example 2 | 123.4 | 1,551 | 0.844 |
| Comparative Example 3 | 120.2 | 1,511 | 0.838 |
| Comparative Example 4 | 140.9 | 1,770 | 0.811 |
| Comparative Example 5 | 152.4 | 1,915 | 0.834 |

Properties of magnetic coating film (when oriented in a magnetic field of 5 kOe)

| Examples and Comparative Examples | Orientation property (OR) | SFD | ΔBm (%) |
|---|---|---|---|
| Example 2 | 3.06 | 0.517 | 2.8 |
| Example 3 | 3.14 | 0.526 | 3.1 |
| Example 4 | 3.07 | 0.491 | 3.9 |
| Comparative Example 1 | 2.98 | 0.545 | 6.3 |
| Comparative Example 2 | 3.09 | 0.536 | 5.4 |
| Comparative Example 3 | 2.94 | 0.544 | 4.9 |
| Comparative Example 4 | 3.19 | 0.542 | 7.9 |
| Comparative Example 5 | 3.04 | 0.539 | 5.7 |

What is claimed is:

1. Spindle-shaped magnetic metal particles containing iron as a main component, having an average major axis diameter (L) of 0.05 to 0.15 μm; an aspect ratio of 4:1 to 7.2:1; a coercive force of 111.4 to 142.2 kA/m; a Co content of from 0.5 to less than 5 atm % based on whole Fe; a crystallite size of from 150 to less than 170 Å; a ratio of Al to Co from 1.1:1 to less than 2.0:1; a specific surface area (S) represented by the formula:

$$S \leq -160 \times L + 65;$$

an oxidation stability ($\Delta\sigma s$) of saturation magnetization of not more than 5.0%; and an ignition temperature of not less than 140° C.

2. Spindle-shaped magnetic metal particles containing iron as a main component according to claim 1, which have an Al content of from 5 to 10 atm % based on whole Fe and a rare earth element content of from 1.5 to 5 atm % based on whole Fe.

3. Spindle-shaped magnetic metal particles containing iron as a main component according to claim 1, which have a size distribution (standard deviation/average major axis diameter) of not more than 0.30.

4. Spindle-shaped magnetic metal particles containing iron as a main component according to claim 1, which are produced by heat-dehydrating spindle-shaped goethite particles to obtain spindle-shaped hematite particles and then heat-reducing the spindle-shaped hematite particles, said spindle-shaped goethite particle comprising a spindle-shaped goethite seed crystal particle containing Co, a goethite layer formed on the surface of the spindle-shaped goethite seed crystal particle, containing Co and Al, and a surface layer form on the goethite layer, comprising rare earth compounds, a cobalt content in the spindle-shaped goethite seed crystal particle being from 0.5 to less than 5 atm % based on whole Fe contained in the spindle-shaped goethite particle, an Al content in the goethite layer being from 5 to 10 atm % based on whole Fe contained in the spindle-shaped goethite particle, and the rare earth content in the surface layer being 1.5 to 5 atm % based on whole Fe contained in the spindle-shaped goethite particle.

5. Spindle-shaped magnetic metal particles containing iron as a main component according to claim 1, which are produced by heat-reducing spindle-shaped hematite particles, said spindle-shaped hematite particle comprising a spindle-shaped hematite core particle containing Co, a hematite layer formed on the surface of the spindle-shaped hematite core particle, containing Co and Al, and a surface layer form on the hematite layer, comprising rare earth compounds, a cobalt content in the spindle-shaped hematite particle being from 0.5 to less than 5 atm % based on whole Fe contained in the spindle-shaped hematite particle, an Al content in the hematite layer being from 5 to 10 atm % based on whole Fe contained in the spindle-shaped hematite particle, and the rare earth content in the surface layer being 1.5 to 5 atm % based on whole Fe contained in the spindle-shaped hematite particle.

6. A process for producing spindle-shaped magnetic metal particles containing iron as a main component, comprising:

a first step comprising: aging a water suspension containing a ferrous-containing precipitate produced by reacting a mixed aqueous alkali solution comprising an aqueous alkali carbonate solution and an aqueous alkali hydroxide solution with an aqueous ferrous salt solution, in a non-oxidative atmosphere; conducting an oxidation reaction of the water suspension by passing an oxygen-containing gas therethrough, thereby producing spindle-shaped goethite seed crystal particles; and passing again an oxygen-containing gas through the water suspension containing both the ferrous-containing precipitate and the spindle-shaped goethite seed crystal particles so as to conduct an oxidation reaction thereof, thereby forming a goethite layer on the surface of the seed crystal particles to obtain spindle-shaped goethite particles, upon the production of said seed crystal particles, a Co compound being added in an amount of from 0.5 to less than 5 atm %, calculated as Co, based on whole Fe, to the water suspension containing the ferrous-containing precipitate during the aging thereof but prior to the elapse of 20% of the whole aging time before initiation of the oxidation reaction; the oxidation reaction being conducted while passing the oxygen-containing gas through the water suspension at a superficial velocity of 2.3 to 3.5 cm/s such that 30 to 50% of whole $Fe^{2+}$ is oxidized; an Al compound being added in an amount of 5 to 10 atm %, calculated as Al, based on whole Fe; and the oxidation reaction being successively conducted to obtain spindle-shaped goethite particles;

a second step comprising treating the spindle-shaped goethite particles obtained in the above first step, with an anti-sintering agent containing a rare earth compound in an amount of 1.5 to 5 atm %, calculated as a rare earth element, based on whole Fe; and then heat-treating the thus treated spindle-shaped goethite particles at a temperature of 650 to 800° C. in a non-reducing atmosphere, thereby obtaining spindle-shaped hematite particles; and a third step comprising charging the spindle-shaped hematite particles obtained in the above second step into a reducing apparatus to form a fixed-bed having a height of 3 to 15 cm; heating the fixed-bed of the spindle-shaped hematite particles to a temperature of 400 to 700° C. at a temperature-rising rate of 10 to 80° C./minute in an atmosphere of a reducing gas passed though the reducing apparatus at a superficial velocity of 40 to 150 cm/s, thereby reducing the spindle-shaped hematite particles; and then forming an oxide coating film on the surface of the thus reduced particles, thereby obtaining the magnetic metal particles containing iron as a main component.

7. A magnetic recording medium comprising:

a non-magnetic substrate; and a magnetic recording layer formed on the non-magnetic substrate comprising a binder resin and spindle-shaped magnetic metal particles containing iron as a main component, which have an average major axis diameter (L) of 0.05 to 0.15 μm; an aspect ratio of 4:1 to 7.2:1; a coercive force of 111.4 to 142.2 ka/m; a Co content of from 0.5 to less than 5 atm % based on whole Fe; a crystallite size of 150 to 170 Å; a ratio of Al to Co from 1.1:1 to less than 2.0:1; a specific surface area (S) represented by the formula:

$$S \leq -160 \times L + 65;$$

an oxidation stability ($\Delta\sigma s$) of saturation magnetization of not more than 5.0%; and an ignition temperature of not less than 140° C.

8. A magnetic recording medium comprising:

a non-magnetic base film;

a non-magnetic undercoat layer formed on said non-magnetic base film; and a magnetic recording layer formed on the non-magnetic substrate comprising a binder resin and spindle-shaped magnetic metal particles containing iron as a main component, which have an average major axis diameter (L) of 0.05 to 0.15 μm; an aspect ratio of 4:1 to 7.2:1; a coercive force of 111.4 to 142.2 kA/m; a Co content of from 0.5 to less than 5 atm % based on whole Fe; a crystallite size of from 150 to less than 170 Å; a ratio of Al to Co from 1.1:1 to less than 2.0:1; a specific surface area (S) represented by the formula:

$$S \leq -160 \times L - 65;$$

an oxidation stability (Δσs) of saturation magnetization of not more than 5.0%; and an ignition temperature of not less than 140° C.

9. Spindle-shaped magnetic metal particles containing iron as a main component, having an average major axis diameter (L) of 0.05 to 0.15 μm; an aspect ratio of 4:1 to 7.2:1; a size distribution (standard deviation/average major axis diameter) of not more than 0.30; an aspect ratio of 4:1 to 8:1; a coercive force of 111.4 to 142.2 kA/m, a Co content of from 0.5 to less than 5 atm % based on whole Fe; an Al content of from 5 to 10 atm % based on whole Fe; a rare earth element content of from 1.5 to 5 atm % based on whole Fe; a crystallite size of from 150 to less than 170 Å; a ratio of Al to Co from 1.1:1 to less than 2.0:1; a specific surface area (S) represented by the formula:

$$S \leq -160 \times L + 65;$$

an oxidation stability (Δσs) of saturation magnetization of not more than 5.0%; and an ignition temperature of not less than 140° C.

10. Spindle-shaped magnetic metal particles containing iron as a main component, having an average major axis diameter (L) of 0.05 to 0.15 μm; an aspect ratio of 4:1 to 7.2:1; a size distribution (standard deviation/average major axis diameter) of 0.10 to 0.28; an aspect ratio of 4:1 to 8:1; a coercive force of 111.4 to 142.2 kA/m; a Co content of 1.0 to 4.8 atm % based on whole Fe; an Al content of from 5.5 to 9.5 atm % based on whole Fe; a rare earth element content of from 2.0 to 4.8 atm % based on whole Fe; a crystallite size of from 150 to less than 170 Å; a ratio of Al to Co 1.1:1 to 1.9:1; a specific surface area (S) represented by the formula:

$$S \leq -160 \times L + 65;$$

an oxidation stability (Δσs) of saturation magnetization of not more than 5.0%; and an ignition temperature of not less than 140° C.

11. A magnetic recording medium having a coercive force value of 111.4 to 143.2 kA/m; a squareness (Br/Bm) of not less than 0.84; an orientation property of not less than 2.8; a coercive force distribution (SFD) of not more than 0.53 and an oxidation stability (ΔBm) of not more than 4.0%, which comprises:
    a non-magnetic substrate; and
    a magnetic recording layer formed on the non-magnetic substrate comprising a binder resin and spindle-shaped magnetic metal particles containing iron as a main component, which have an average major axis diameter (L) of 0.05 to 0.15 μm; an aspect ratio of 4:1 to 7.2:1; a coercive force of 111.4 to 142.2 kA/m; a Co content of from 0.5 to less than 5 atm % based on whole Fe; a crystallite size of 150 to 170 Å; a ratio of Al to Co from 1.1:1 to less than 2.0:1; a specific surface area (S) represented by the formula:

$$S \leq -160 \times L + 65;$$

an oxidation stability (Δσs) of saturation magnetization of not more than 5.0%; and an ignition temperature of not less than 140° C.

* * * * *